United States Patent
Matsukawa et al.

(10) Patent No.: US 8,318,885 B2
(45) Date of Patent: Nov. 27, 2012

(54) CURABLE RESIN COMPOSITION, CURED PRODUCT THEREOF, AND VARIOUS ARTICLES DERIVED FROM THOSE

(75) Inventors: Kimihiro Matsukawa, Tondabayashi (JP); Takeshi Fukuda, Osaka (JP); Hideki Goda, Osaka (JP)

(73) Assignee: Arakawa Chemical Industries Ltd., Osaka (JP)

( * ) Notice: Subject to any disclaimer, the term of this patent is extended or adjusted under 35 U.S.C. 154(b) by 0 days.

(21) Appl. No.: 12/772,972

(22) Filed: May 3, 2010

(65) Prior Publication Data
US 2010/0215937 A1 Aug. 26, 2010

Related U.S. Application Data

(62) Division of application No. 11/989,568, filed as application No. PCT/JP2006/314235 on Jul. 19, 2006.

(30) Foreign Application Priority Data

| Jul. 28, 2005 | (JP) | 2005-219428 |
| Jan. 17, 2006 | (JP) | 2006-008729 |
| Jan. 17, 2006 | (JP) | 2006-008841 |
| Mar. 28, 2006 | (JP) | 2006-088279 |

(51) Int. Cl.
- C08G 77/28 (2006.01)
- C08G 77/04 (2006.01)
- C08G 77/06 (2006.01)
- C08G 77/08 (2006.01)

(52) U.S. Cl. .......... 528/28; 528/10; 528/12; 528/25

(58) Field of Classification Search .......... 525/25, 525/28, 44
See application file for complete search history.

(56) References Cited

U.S. PATENT DOCUMENTS

| 3,773,703 A | 11/1973 | Smeal |
| 4,289,867 A | 9/1981 | Martin |

(Continued)

FOREIGN PATENT DOCUMENTS

JP 56-110732 A 9/1981

(Continued)

OTHER PUBLICATIONS

"Dai 24 Kai Muki Kobunshi Kenkyu Toronkai Koen Yoshishu", The Society of Polymer Science, Nov. 10, 2005, pp. 71-72, Japan.

(Continued)

Primary Examiner — Robert S Loewe
(74) Attorney, Agent, or Firm — Sughrue Mion, PLLC

(57) ABSTRACT

A curable resin composition which is easily cured by heating or ultraviolet irradiation and capable of forming a thick cured film due to low shrinkage. This curable resin composition enables to obtain a cured product satisfying various characteristics such as heat resistance, chemical resistance, high surface hardness and high refractive index. Also disclosed is a cured product obtained from such a composition. Specifically disclosed is a curable resin composition containing at least one substance selected from the group consisting of condensates (A) obtained by hydrolyzing and condensing a thiol group-containing alkoxysilane (a1) represented by the following general formula:

$$R1Si(OR2)3 \quad (1)$$

(wherein, R1 represents a hydrocarbon group having at least one thiol group and 1-8 carbon atoms or an aromatic hydrocarbon group having at least one thiol group, and R2 represents a hydrogen atom, a hydrocarbon group having 1-8 carbon atoms or an aromatic hydrocarbon group), compounds (B) having an epoxy group, compounds (C) having an isocyanate group and compounds (D) having a carbon-carbon double bond.

22 Claims, 2 Drawing Sheets

U.S. PATENT DOCUMENTS

| | | | |
|---|---|---|---|
| 4,546,018 A * | 10/1985 | Ryuzo et al. | 427/407.2 |
| 4,622,412 A | 11/1986 | Piskoti | |
| 5,015,717 A | 5/1991 | Martin et al. | |
| 5,047,492 A * | 9/1991 | Weidner et al. | 528/15 |
| 5,162,452 A | 11/1992 | Herzig et al. | |
| 5,364,921 A | 11/1994 | Gray et al. | |
| 5,492,981 A | 2/1996 | Hoehn et al. | |
| 5,609,856 A * | 3/1997 | Dubief et al. | 424/70.1 |
| 5,789,476 A * | 8/1998 | Iryo et al. | 524/430 |
| 5,814,703 A | 9/1998 | Yamaya et al. | |
| 5,902,847 A | 5/1999 | Yanagi et al. | |
| 5,939,576 A | 8/1999 | Lichtenhan et al. | |
| 6,214,899 B1 * | 4/2001 | Chawla et al. | 522/84 |
| 6,288,198 B1 * | 9/2001 | Mechtel et al. | 528/28 |
| 6,376,100 B1 | 4/2002 | Shiobara et al. | |
| 6,727,339 B2 | 4/2004 | Luginsland et al. | |
| 6,881,416 B2 | 4/2005 | Fry | |
| 6,927,270 B2 * | 8/2005 | Lichtenhan et al. | 528/12 |
| 6,933,345 B1 * | 8/2005 | Lichtenhan et al. | 525/101 |
| 7,670,492 B2 * | 3/2010 | Tavlarides et al. | 210/681 |
| 2002/0051889 A1 | 5/2002 | Kanamori et al. | 428/447 |
| 2003/0050408 A1 * | 3/2003 | Puhala et al. | 525/479 |
| 2003/0055193 A1 * | 3/2003 | Lichtenhan et al. | 528/10 |
| 2003/0109614 A1 | 6/2003 | Luginsland et al. | |
| 2003/0120099 A1 * | 6/2003 | Laine et al. | 556/450 |
| 2003/0176396 A1 * | 9/2003 | Shea et al. | 514/63 |
| 2004/0054047 A1 * | 3/2004 | Lai et al. | 524/268 |
| 2004/0260048 A1 * | 12/2004 | Itagaki et al. | 528/34 |
| 2006/0189736 A1 * | 8/2006 | Mori et al. | 524/404 |
| 2009/0286015 A1 | 11/2009 | Matsukawa et al. | |
| 2010/0215937 A1 | 8/2010 | Matsukawa et al. | |

FOREIGN PATENT DOCUMENTS

| | | |
|---|---|---|
| JP | 63-168434 A | 7/1988 |
| JP | 3-31362 A | 2/1991 |
| JP | 8-20707 A | 1/1996 |
| JP | 8-134219 A | 5/1996 |
| JP | 9-111188 A | 4/1997 |
| JP | 10-130393 A | 5/1998 |
| JP | 2001-055486 A | 2/2001 |
| JP | 2003-49118 A | 2/2003 |
| JP | 2003-113243 A | 4/2003 |
| JP | 2005-171159 A | 6/2005 |
| JP | 2006-22142 A | 1/2006 |
| JP | 2006-22146 A | 1/2006 |
| JP | 2006-022152 A | 1/2006 |
| JP | 2007-291313 A | 11/2007 |

OTHER PUBLICATIONS

"Dai 14 Kai Polymer Material Forum Yoshishu", The Society of Polymer Science, Nov. 10, 2005, p. 60, Japan.

* cited by examiner

CURABLE RESIN COMPOSITION, CURED PRODUCT THEREOF, AND VARIOUS ARTICLES DERIVED FROM THOSE

This application is a Divisional of U.S. application Ser. No. 11/989,568, which is a 371 of International Application No. PCT/JP2006/314235 filed on Jul. 19, 2006, hereby incorporated by reference.

TECHNICAL FIELD

The present invention relates to a curable resin composition, a cured product obtained by curing the composition, and various articles derived there from.

BACKGROUND ART

Transparent plastic is lighter and has better processability as compared to glass, and therefore exploited for optical materials such as a lens. However, since plastic has commonly a low refractive index, the lens becomes thicker. This results in such problems as loss of lightness in weight and low heat resistance.

For improving a refractive index of plastic, there is a method of introducing a sulfur atom in a molecular structure of plastic. Since a compound having a thiol group can be thermocured with epoxies and isocyanates, a sulfur atom originated from a thiol group can be introduced in the structure of plastic. A cured product thus obtained has a high refractive index. Particularly, a thiol urethane resin (for example, see Japanese Unexamined Patent Publication No. 3-236386) obtained by reaction with isocyanates is exploited for a lens and other purposes. However, it has not been satisfactory in terms of heat resistance.

On the other hand, a compound having a thiol group can be photocured with a compound having a carbon-carbon double bond by an ene-thiol reaction. The advantages of the ene-thiol reaction are that the reaction proceeds by irradiation of ultraviolet rays regardless of with or without a polymerization initiator, that the reaction is not susceptible to reaction inhibition by oxygen and that the curing contraction is low, as compared to radical polymerization, which is a common operation in photocuring. With regard to a curing method and a cured product exploiting this reaction, a method using an unsaturated thiol compound having a carbon-carbon double bond and a thiol group in a molecule (for example, see Japanese Unexamined Patent Publication No. 49-51333), and a resin composition comprising a compound having a plurality of carbon-carbon double bonds and a compound having a plurality of thiol groups in a molecule (for example, see Japanese Unexamined Patent Publication No. 49-54491, Japanese Unexamined Patent Publication No. 50-27836, Japanese Unexamined Patent Publication No. 53-13409 and Japanese Unexamined Patent Publication No. 2003-295431) are proposed. Thus, the ene-thiol reaction enables to produce a cured product of thick film, so that it becomes possible to produce an article with thickness such as a lens. However, the resultant cured product was also not satisfactory in terms of heat resistance.

In recent years, so-called an organic-inorganic hybrid technology is drawing attention as a means of further enhancing the properties of an organic material, in which an inorganic material is composited to an organic material so as to provide properties of the inorganic material such as high heat resistance, chemical resistance and surface hardness. Among the technology, a method excelling in transparency and enabling thick film curing is the organic-inorganic hybrid method exploiting silsesquioxane. Silsesquioxane is a kind of silica and represented by $RSiO_{3/2}$. Since it easily provides an organic-inorganic hybrid cured product by bringing a substituent that has reactivity with an organic material into the R position, the practical utilization thereof has been studied (for example, see Japanese Patent No. 3653976, Japanese Patent No. 3598749, Japanese Unexamined Patent Publication No. 10-330485 and Published Japanese Translation No. 2003-533553 of the PCT Application). Although these organic-inorganic hybrid cured products excel in heat resistance, there exists a problem that the refractive index is low in general, since the inorganic component is silica whose refractive index is low.

With regard to an organic-inorganic hybrid that introduces a sulfur atom for the purpose of increasing a refractive index, a composition comprising silicone having a carbon-carbon double bond and silicone having a thiol group (for example, see Japanese Unexamined Patent Publication No. 56-110731, Japanese Unexamined Patent Publication No. 60-110752, Japanese Unexamined Patent Publication No. 05-320511 and United States Patent Application Serial No. 2004/209972) is known. However, satisfactory heat resistance and surface hardness are not obtained by the methods provided in the descriptions in these patent documents, since the inorganic component to be used is silicone (rubber state at room temperature).

DISCLOSURE OF INVENTION

Objects of the present invention are to provide a curable resin composition, which is easily cured by being subjected to heat or ultraviolet rays, enables thick film curing due to the low contractility and realizes a cured product satisfying various properties such as heat resistance, chemical resistance, high surface hardness and high refractive index, and to provide a cured product obtained from the composition.

The present inventors were devoted themselves to the study on solving the above objects, and found the solution to complete the present invention. That is the above objects are solved by a composition comprising a compound having a hydrolyzed condensate of thiol-containing alkoxysilanes and at least one kind selected from a group of a compound having an epoxy group (B), a compound having an isocyanate group (C) and a compound having a carbon-carbon double bond (D), and a cured product thereof.

The present invention relates to a curable resin composition, which comprises a condensate (A) obtained by hydrolysis and condensation of a thiol-containing alkoxysilanes (a1) of the general formula (1):

$$R^1Si(OR^2)_3 \tag{1}$$

(wherein $R^1$ represents a hydrocarbon group of carbon number 1 to 8, which has at least one thiol group, or an aromatic hydrocarbon group having at least one thiol group; and $R^2$ represents a hydrogen atom, hydrocarbon group of carbon number 1 to 8 or aromatic hydrocarbon group)
and at least one kind selected from a group of a compound having an epoxy group (B), a compound having an isocyanate group (C) and a compound having a carbon-carbon double bond (D). The present invention also relates to a cured product prepared by curing the composition with heat. The present invention further relates to various articles derived therefrom.

BEST MODE FOR CARRYING OUT THE INVENTION

Figure 1:
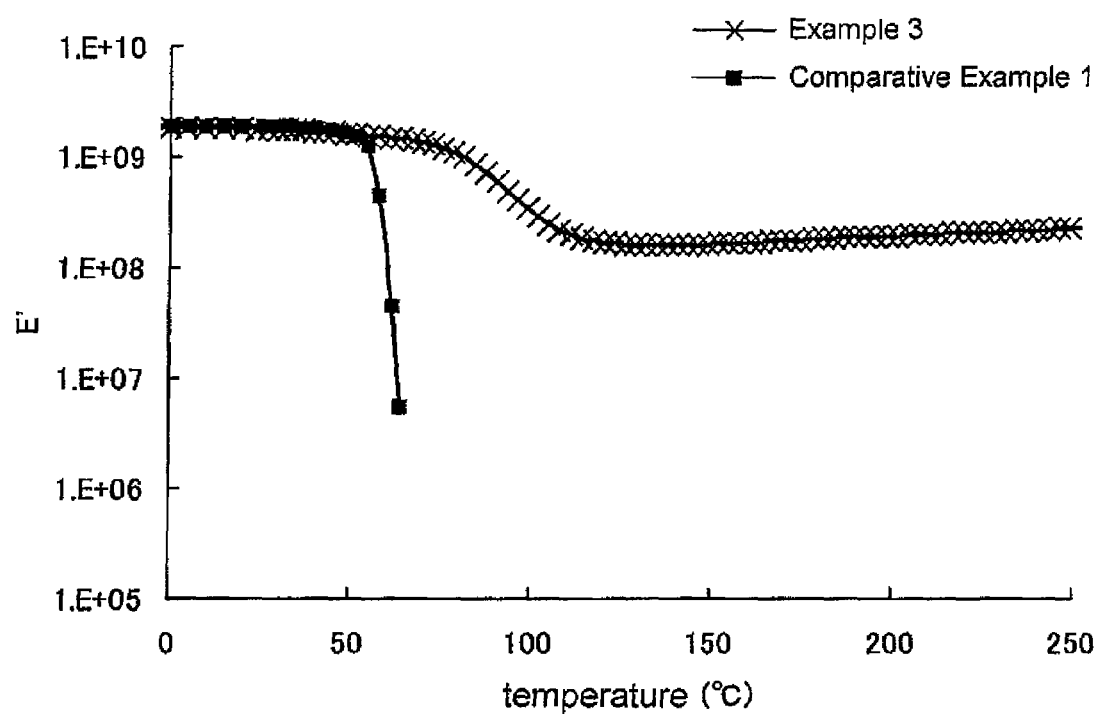
FIG. 1 shows correlation of temperature and dynamic storage elastic modulus of cured products obtained from compositions of Example 3 and Comparative Example 1.

The component (A) used in the present invention is a compound obtained by hydrolysis and condensation of a thiol group-containing alkoxysilanes (a1) represented by the general formula (1):

$$R^1Si(OR^2)_3 \quad (1)$$

(wherein $R^1$ represents a hydrocarbon group of carbon number 1 to 8, which has at least one thiol group, or an aromatic hydrocarbon group having at least one thiol group; and $R^2$ represents a hydrogen atom, hydrocarbon group of carbon number 1 to 8 or aromatic hydrocarbon group).

Specific examples of thiol group-having alkoxysilanes (a1) (hereinafter called a component (a1)) include 3-mercaptopropyltrimethoxysilane, 3-mercaptopropyltriethoxysilane, 3-mercaptopropyltripropoxysilane, 3-mercaptopropyltributoxysialne, 1,4-dimercapto-2-(trimethoxysilyl)butane, 1,4-dimercapto-2-(triethoxysilyl)butane, 1,4-dimercapto-2-(tripropoxysilyl)butane, 1,4-dimercapto-2-(tributoxysilyl)butane, 2-mercaptomethyl-3-mercaptopropyltrimethoxysilane, 2-mercaptomethyl-3-mercaptopropyltriethoxysilane, 2-mercaptomethyl-3-mercaptopropyltripropoxysilane, 2-mercaptomethyl-3-mercaptopropyltributoxysilane, 1,2-dimercaptoethyltrimethoxysilane, 1,2-dimercaptoethyltriethoxysilane, 1,2-dimercaptoethyltripropoxysilane and 1,2-dimercaptoethyltributoxysilane. These compounds can be used alone or in proper combination. Among the examples, 3-mercaptopropyltrimethoxysilane is particularly preferred because of high reactivity in hydrolysis reaction and of easiness in procurement.

In addition to the component (a1), metal alkoxides (a2) (hereinafter called a component (a2)) can be used, which includes trialkylalkoxysilanes such as trimethylmethoxysilane, trimethylethoxysilane, triethylmethoxysilane, triethylethoxysilane, triphenylmethoxysilane and triphenylethoxysilane; dialkyldialkoxysilanes such as dimethyldimethoxysilane, dimethyldiethoxysilane, diethyldimethoxysilane, diethyldiethoxysilane, diphenyldimethoxysilane, diphenyldiethoxysilane, methylphenyldimethoxysilane, methylphenyldiethoxysilane and 3-mercaptopropylmethyldimethoxysilane; alkyltrialkoxysilanes such as methyltrimethoxysilane, methyltriethoxysilane, ethyltrimethoxysilane, ethyltriethoxysilane, phenyltrimethoxysilane, phenyltriethoxysilane; tetraalkoxysilanes such as tetramethoxysilane, tetraethoxysilane, tetrapropoxysilane and tetrabutoxysilane; tetraalkoxytitaniums such as tetramethoxytitanium, tetraethoxytitanium, tetrapropoxytitanium and such as tetraethoxyzirconium, tetrapropoxyzirconium and tetrabutoxyzirconium. The component (a2) can be used alone or in combination of at least two kinds. Among others, use of trialkylalkoxysilanes, dialkyldialkoxysilanes or tetraalkoxysilanes allows the crosslinking density in the component (A) to be adjusted. Use of alkyltrialkoxysilanes allows the quantity of a thiol group in the component (A) to be adjusted. Use of tetraalkoxytitaniums or tetraalkoxyzirconiums allows a refractive index of the finally obtained cured product to increase.

When both component (a1) and component (a2) are used together, it is preferred that [mole number of thiol group included in the component (a1)]/[total mole number of component (a1) and component (a2)] (mole ratio: mean number of thiol group per molecule) is at least 0.2. When it is less than 0.2, the number of thiol groups in the component (A) decreases. This may cause deterioration of curability and insufficiency in improvement effect of the physical properties of the cured product, such as hardness. It is preferred that [total mole number of alkoxy group included in component (a1) and component (a2)]/[total mole number of component (a1) and component (a2)] (mole ratio: mean number of alkoxy group per molecule) is from 2.5 to 3.5, and particularly from 2.7 to 3.2. When it is less than 2.5, the crosslinking density of the resultant component (A) tends to be low, and to decrease heat resistance of the cured product. When it exceeds 3.5, the component (A) tends to be gelatinized in its production.

The component (A) used in the present invention is prepared by hydrolysis, followed by condensation of the component (a1) alone, or optionally in combination with the component (a2). As a result of hydrolysis reaction, alkoxy groups included in the component (a1) and (a2) turn into hydroxyl groups, and alcohol is by-produced. The amount of water necessary for the hydrolysis reaction is acceptable if [mole number of water used for hydrolysis reaction]/[total mole number of alkoxy group included in component (a1) and component (a2)] (mole ratio) falls within 0.4 to 10. The preferred mole ratio is 1. It is not preferred that the mole ratio is less than 0.4, because some alkoxy groups remain in the component (A) without being hydrolyzed. It is of disadvantage economically that the mole ratio exceeds 10, because the amount of water that ought to be removed increases during the condensation reaction (dehydration reaction) conducted thereafter.

When metal alkoxides with high hydrolytic activity and condensation reactivity, such as tetraalkoxytitaniums and tetraalkoxyzirconiums, are used as the component (a2), the hydrolysis and condensation reaction may proceed rapidly and therefore the system is gelatinized in some cases. In such cases, gelatinization can be avoided by terminating a hydrolysis reaction of the component (a1) so as to create a state where the whole water is substantially consumed, followed by addition of the component (a2).

A catalyst used for the hydrolysis reaction is not particularly limited, and any conventionally known hydrolysis catalyst can be used. Among others, formic acid is preferred because it has high catalytic reactivity and also functions as a catalyst for the condensation reaction to be followed. The amount of formic acid to be added is preferably from 0.1 to 25 parts by weight based on 100 parts by weight of the components (a1) and (a2) in total, and more preferably from 1 to 10 parts by weight. When the amount exceeds 25 parts by weight, stability of the resultant curable resin composition tends to decrease, and the amount of formic acid that ought to be removed tends to increase even if formic acid can be removed in the later step. On the other hand, when the amount is less than 0.1 parts by weight, there are such tendencies that the reaction does not proceed in practical and reaction time lingers. Although the reaction temperature and time can be determined arbitrarily according to the reactivity of the components (a1) and (a2), they are commonly from 0 to 100° C., preferably from 20 to 60° C., and from 1 minute to 2 hours. The hydrolysis reaction can be conducted in the presence of or in the absence of a solvent. The solvent is not particularly limited, and any solvents can be used by selecting one or more kinds. However, it is preferred to use the same solvent as that used for the after stated condensation reaction. It is preferred to conduct the hydrolysis reaction in the absence of a solvent when the reactivity of the components (a1) and (a2) is low.

When the hydrolysis reaction is conducted by the above stated method, it is preferred that the reaction proceed satisfying [mole number of hydroxyl group produced by hydrolysis]/[mole number of alkoxy group included in component (a1) and component (a2) in total] (mole ratio) being at least 0.5, and more preferably being adjusted to at least 0.8. The condensation reaction that follows the hydrolysis reaction proceeds not only between hydroxyl groups produced by hydrolysis, but between a hydroxyl group and a remaining alkoxy group. Therefore, it may be sufficient if half (at least 0.5 in terms of mole ratio) the component is hydrolyzed.

In the condensation reaction, water is by-produced between hydroxyl groups and alcohol is by-produced between a hydroxyl group and an alkoxy group, hydrolyzed alkoxy silane changes to be glassfied. In the condensation reaction, any conventionally known catalyst for hydration condensation can be used. As stated above, formic acid is preferred because it has high catalytic activity and is commonly used for hydrolysis and condensation reactions. Although the reaction temperature and time can be determined arbitrarily according to the reactivity of the components (a1) and (a2), they are commonly from 40 to 150° C., preferably from 60 to 100° C., and from 30 minutes to 12 hours.

In conducting the condensation reaction by the above method, it is preferred that the reaction proceeds satisfying [total mole number of unreacted hydroxyl group and unreacted alkoxy group]/[total mole number of alkoxy group included in component (a1) and component (a2)] (mole ratio) being at most 0.3, and it is more preferred to adjust it to at most 0.2. It is not preferred that the mole ratio exceeds 0.3, because it may damage the performance of the cured product, such as gelatinization due to condensation reaction of unreacted hydroxyl group and alkoxy group while the curable resin composition is stored, and occurrence of crack caused by volatile components that generate as a result of condensation reaction after curing.

It is preferred that the condensation reaction is conducted by diluting the component (a1) (both components when (a2) is used) in a solvent in an amount of 2 to 80% by weight in concentration, and more preferably from 15 to 60% by weight. It is preferred to use a solvent whose boiling point is higher than that of water and alcohol which generate in the condensation reaction, because it allows them to be distilled off out of the reaction system. It is not preferred that the concentration is less than 2% by weight, because the component (A) included in the resultant curable composition amounts to less. When the concentration exceeds 80% by weight, there tends to occur gelatinization during the reaction, or to deteriorate storage stability of the resultant curable composition, since the molecular weight of the component (A) to be produced becomes too large. Any solvent can be used by selecting one or more kinds. It is preferred to use a solvent whose boiling point is higher than that of water and alcohol which generate in the condensation reaction, because it allows them to be distilled off out of the reaction system. The component (B) can be used as a part of the solvent.

It is preferred to remove the catalyst to be used after termination of the condensation reaction, since stability of the finally obtained curable resin composition improves. The removal method can be properly selected among known methods according to the catalyst used. For example, formic acid can be easily removed after termination of the condensation reaction by heating it at higher temperature than the boiling point or reducing pressure. Formic acid is preferred in this regard too.

The curable composition of the present invention includes a thermosetting resin composition or an ultraviolet curable resin composition according to the composition. When it is a thermosetting resin composition, the composition comprises preferably a condensate (A) and at least one kind selected from a compound having an epoxy group (B) and a compound having an isocyanate group (C). When it is an ultraviolet curable composition, the composition comprises preferably a condensate (A) and a compound having a carbon-carbon double bond (D). It is also available that the composition includes both at least one kind selected from a compound having an epoxy group (B) and a compound having an isocyanate group (C) and a compound having a carbon-carbon double bond (D), so as to be a resin composition curable with both heat and light.

Hereinafter, thermosetting resin composition will be described.

The component (B) used in the present invention is not particularly limited, and conventionally known compounds having an epoxy group can be properly used. Examples thereof include a phenol novolak-type epoxy resin, cresol novolak-type epoxy resin, bisphenol A-type epoxy resin, bisphenol F-type epoxy resin, bisphenol S-type epoxy resin, hydrogenated bisphenol A-type epoxy resin, hydrogenated bisphenol F-type epoxy resin, stilbene-type epoxy resin, triazine structure-containing epoxy resin, fluorene structure-containing epoxy resin, linear aliphatic epoxy resin, alicyclic epoxy resin, glycidylamine-type epoxy resin, triphenol phenol methane-type epoxy resin, alkyl modified triphenol methane-type epoxy resin, biphenyl-type epoxy resin, dicyclopentadiene structure-containing epoxy resin, naphthalene structure-containing epoxy resin and arylalkylene-type epoxy resin. These compounds can be used alone or in combination of at least two kinds. Among these compounds exemplified, a bisphenol A-type epoxy resin (such as "Epicoat 828" (trade name) manufactured by Japan Epoxy Resins Co. Ltd.), bisphenol F-type epoxy resin (such as "Epicoat 807" (trade name) manufactured by Japan Epoxy Resins Co. Ltd.), hydrogenated bisphenol A-type epoxy resin (such as "Suntohto ST-3000" (trade name) manufactured by Tohto Kasei Co. Ltd.) and alicyclic epoxy resin (such as "Celloxide 2021" (trade name) manufactured by Daicel Chemical Industries Ltd.) are particularly preferred, because cured products ultimately obtained therefrom excel in such properties as colorless transparency and heat resistance, and are easily procured.

As the component (B), a compound having a higher molecular weight than the above compounds can be used. The thermosetting resin composition comprising the component with a high molecular weight tends to give a cured product with enhanced flexibility. Examples of the compound with a high molecular weight include a bisphenol A-type resin composition and bisphenol F-type resin composition whose epoxy equivalent is at least 2,000 g/eq (such as "Epicoat 1010" and "Epicoat 4007P" (trade name) manufactured by Japan Epoxy Resins Co. Ltd.), an epoxy modified silicone (such as "X-22-163A" (trade name) manufactured by Shin-Etsu Chemical Co. Ltd.) and polyethylene glycol diglycidyl ether. These compounds can be used alone or in combination of at least two kinds. Among others, polyethylene glycol diglycidyl ether is preferred.

The component (C) used in the present invention is not particularly limited, and conventionally known compounds having an isocyanate group can be properly used. The diisocyanate compounds are exemplified by known aromatic, aliphatic and alicyclic diisocyanates. Specific examples thereof include 1,5-naphthylene diisocyanate, 4,4'-diphenylmethane diisocyanate, 4,4'-diphenyldimethylmethane diisocyanate, 4,4'-dibenzyl isocyanate, dialkyldiphenylmethane diisocyanate, tetraalkyldiphenylmethane diisocyanate, 1,3-phenylene diisocyanate, 1,4-phenylene diisocyanate, tollylene diisocyanate, butane-1,4-diisocyanate, hexamethylene diisocyanate, isopropylene diisocyanate, methylene diisocyanate, 2,2,4-trimethylhexamethylene diisocyanate, 2,4,4-trimethylhexamethylene diisocyanate, cyclohexane-1,4-diisocyanate, xylylene diisocyanate, hydrogenated xylylene diisocyanate, isophorone diisocyanate, lysine diisocyanate, dicyclohexylmethane-4,4'-diisocyanate, 1,3-bis(isocyanate methyl)cyclohexane, methylcyclohexane diisocyanate, m-tetramethylxylylene diisocyanate and dimer diisocyanate produced by converting carboxyl groups of a dimer acid into isocyanate groups. These compounds can be used alone or in combination of at least two kinds. Among the compounds exemplified, isophorone diisocyanate is particularly preferred because a cured product ultimately obtained therefrom excels in such properties as colorless transparency and heat resistance, and is easily procured.

As the component (C), a compound having a higher molecular weight than the above compounds can be used. The thermosetting resin composition comprising the component with a high molecular weight tends to give a cured product with enhanced flexibility. Examples of the compound with a high molecular weight include polyols modified with diisocyanate such as polycarbonate diol and polyester diol; and polymeric MDI ("Cosmonate M" (trade name) manufactured by Mitsui Takeda Chemicals Inc.). These compounds can be uses alone or in combination of at least two kinds.

The catalyst usable for preparation of the thermocured resin composition is not particularly limited, and conventionally known epoxy curing catalysts can be used when the component (B) is used. Examples thereof include tertiary amines such as 1,8-diaza-bicyclo[5.4.0]undecene-7, triethylenediamine, benzyldimethylamine, triethanolamine, dimethylaminoethanol, tris(dimethylaminomethyl)phenol; imidazoles such as 2-methylimidazole, 2-phenylimidazole, 2-phenyl-4-methylimidazole and 2-heptadecylimidazole; organic phosphines such as tributylphosphine, methyldiphenylphosphine, triphenylphosphine, diphenylphosphine and phenylphosphine; and tetraphenylboron salts such as tetraphenylphosphonium.tetraphenylborate, 2-ethyl-4-methylimidazole-tetraphenylborate and N-methylmorphorine.tetraphenylborate. It is preferred that the curing catalyst is used in an amount of 0.01 to 5 parts by weight based on 100 parts by weight of the thermosetting resin composition.

When the component (C) is used, conventionally known urethane-forming catalysts can be used. Examples thereof include organic tin compounds such as dibutyl tin laurate and tin octylate; and tertiary amines such as 1,8-diaza-bicyclo [5.4.0]undecene-7, triethylenediamine, benzyldimethylamine, triethanolamine, dimethylaminoethanol, tris(dimethylaminomethyl)phenol. It is preferred that the urethane-forming catalyst is used in an amount of 0.01 to 5 parts by weight based on 100 parts by weight of the thermosetting resin composition.

The concentration of the active component (A), (B) or (C) included in the thermosetting resin composition can be properly determined according to the application. A solvent can also be added if necessary. Any solvent can be used as long as the solvent is non-reactive with the above components, and conventionally known solvents are properly selected. When the thermosetting resin composition is used as a coating agent, it is diluted with a solvent until the intended viscosity is obtained. When the thermosetting resin composition is cured into a thick film of at least 1 mm, or when it is used as an adhesive, it is preferred that the total concentration of the component (A), (B) or (C) is adjusted to at least 90% by weight, and more preferably at least 95% by weight. The total concentration can be calculated either from the concentration of the component (A), (B) or (C) and the amount of a solvent to be added when the thermosetting resin composition is fed, or from the weight change of the thermosetting resin composition before and after heating it at a higher temperature than the boiling point of the solvent included therein for about 2 hours. When the concentration is less than 90% by weight, the composition tends to make bubbles upon curing or molding, or the solvent remains in the cured product, which tends to cause decline of the physical properties. Incidentally, since a solvent is used when the component (A) is synthesized, the solvent may be volatilized so as for the content of a nonvolatile matter to be at least 90% by weight after completion of a reaction in this application. It is also possible to increase the total concentration of the active components (A), (B) and/or (C) by volatilizing the solvent to be used after preparation of the thermosetting resin composition.

In preparation of the thermosetting resin composition, it is preferred to mix the component (A), (B) or (C) in a ratio that satisfies [mole number of thiol group included in component (A)]/[mole number of epoxy group included in component (B) or mole number of isocyanate group included in component (C)] (mole ratio) being from 0.9 to 1.1, and more preferably being 1.0. When the mole ratio is less than 0.9, an epoxy group and isocyanate group may remain after thermocuring (thermosetting), and the weather resistance tends to decline. When it exceeds 3.1, a thiol group remains and releases a strong odor in some cases by the decomposition.

In using the component (B) or (C), it is preferred to satisfy [mole number of epoxy group included in component (B) or mole number of isocyanate group included in component (C)]/[mole number of component (B) or component (C)] (mole ratio: mean number of epoxy group or isocyanate group per molecule) being at least 2. When the mole ratio is less than 2, there tends to decrease the physical properties of the cured product, such as heat resistance and surface hardness, since the curing property of the thermosetting resin composition declines and also the crosslinking density of the resultant cured product becomes low.

In the thermosetting resin composition, the above mentioned component (a1) and/or the hydrolysate (excluding the condensate) (hereinafter called component (E) collectively) can be mixed according to the application. As the component (E), the component (a1) used for synthesis of the component (A) can be used as it is, or the hydrolysate can be used, or both of them can be used in combination. There is an advantage of enhancing adhesiveness, when the thermosetting resin composition including the component (E) is used as a coating agent for inorganic substrates such as glass and metals. The amount of the component (E) to be mixed is preferably about from 0.1 to 20 parts by weight based on 100 parts by weight of the composition. When the amount is less than 0.1 parts by weight, the adhesiveness improving effect of the thermosetting resin composition tends to be insufficient for the inorganic substrate. When it exceeds 20 parts by weight, the thermosetting resin composition tends to fail to be cured in a thick film form, or the resultant cured product tends to be brittle, because volatile components increase upon hydrolysis reaction or condensation reaction of the component (E). As the component (E), 3-mercaptopropyltrimethoxysilane is particularly preferred in terms of adhesiveness improving effect.

In the thermosetting resin composition, metal alkoxides, the above mentioned component (a2), and/or the hydrolysate (excluding the condensate) (hereinafter called component (F) collectively) can be mixed according to the application. As the component (F), the metal alkoxides used for synthesis of the component (A) can be used as it is, or the hydrolysate can be used, or both of them can be used in combination. By using the thermosetting resin composition including the component (F), a refractive index of the resultant cured product can be adjusted. When the thermosetting resin composition is used as a coating agent with a high refractive index, alkoxytitaniums and alkoxyzirconiums are preferred as the component (F). It is preferred that the amount of the component (F) to be mixed is about from 0.1 to 20 parts by weight based on 100 parts by weight of the thermosetting resin composition. When the amount is less than 0.1 parts by weight, the refractive index improving effect tends to be insufficient. When it exceeds 20 parts by weight, the thermosetting resin composition tends to make bubble or generate a warp or crack upon curing, or the resultant cured product becomes brittle, because volatile components increase when the component (F) is hydrolyzed or condensed.

It is also possible to add a plasticizer, weatherproof agent, antioxidant, thermal stabilizer, lubricant, antistatic agent, brightening agent, colorant, conductive agent, mold release agent, surface treatment agent, viscosity adjusting agent and/or filler to the thermosetting resin composition, according to need, within a scope of not damaging the effect of the present invention.

An aspect is exemplified, in which the thermosetting resin composition is used as a cured product. The thermosetting resin composition is fed into a vessel coated with Teflon (trade name). It is heated for drying up a solvent and being cured, so as to give an intended hybrid cured product. The curing temperature and heating time are properly determined, considering the kind of the component (B) or (C) to be used, kind of a solvent and thickness of the cured product. It is preferred to conduct the curing commonly under the conditions of at about 20 to 150° C. for about 1 minute to 24 hours. By heating the cured product at about 100° C. to 300° C., preferably at least 120° C. and less than 250° C., for 1 minute to 6 hours after termination of the curing, the residual solvent is completely removed and the curing reaction proceed furthermore. A cured film obtained in this way has such properties as excellent heat resistance and chemical resistance due to the effect of silica composite.

Hereinafter, an ultraviolet curing composition will be described.

The component (D) used in the present invention is not particularly limited, and conventionally known compounds having a carbon-carbon double bond can be properly used. Examples of a functional group having a carbon-carbon double bond include a vinyl group, acrylic group, methacrylic group and allyl group.

The carbon-carbon double bond of the component (D) reacts (ene-thiol reaction) with a thiol group of the component (A), but the reaction mechanism is different according to the presence or absence of a polymerization initiator.

When the polymerization initiator is not used, the present reaction is considered to proceed according to the following reaction mechanism [reaction formula (1)].

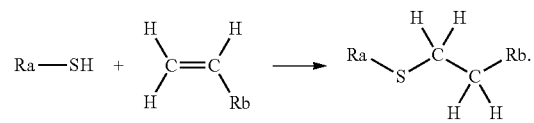

(wherein $R_a$ represents a residual group of the component (A) other than a thiol group; and $R_b$ represents a residual group of the component (B) other than a carbon-carbon double bond). That is, it is a one to one addition reaction of a thiol group and a carbon-carbon double bond.

On the other hand, when a polymerization initiator is used, the present reaction is said to proceed according to, coupled with the above addition reaction shown by the reaction formula (1), the following chain radical reaction process [reaction formula (2) to (5)] accompanied by a side reaction shown by the reaction formula (6).

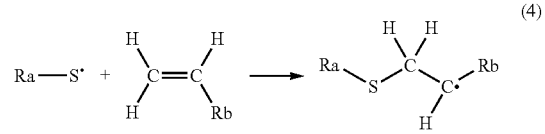

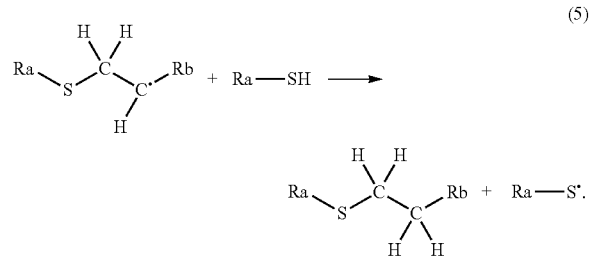

(wherein I represents a polymerization initiator). That is, the reaction goes through the stages of: the reaction formula (2) wherein a radical is generated with ultraviolet rays in the presence of a polymerization initiator; the reaction formula (3) wherein a hydrogen of a thiol group of the component (A) is drawn out and a thiyl radical is generated; the reaction formula (4) wherein the thiyl radical generated in the component (A) reacts with a carbon-carbon double bond of the component (B), and a carbon radical is generated; and the reaction formula (5) wherein the carbon radical draws out hydrogen of the thiol group in the component (A), and a thiyl radical revives.

The side reaction is shown by the reaction formula (6).

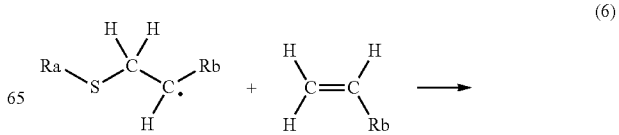

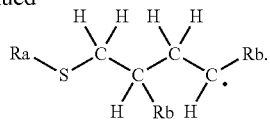

In the reaction formula (6), the carbon radical generated in the reaction formula (4) reacts with a carbon-carbon double bond of the component (D) and a carbon radical revives. This results in simultaneous polymerization reaction of the component (D).

As stated above, a thiol group in the component (A) and a carbon-carbon double bond in the component (D) react in a one to one ratio when the polymerization initiator is not used, while they react in a one to one or more ratio when the polymerization initiator is used.

From the above viewpoint, the ratio of the component (A) and the component (D) is properly determined in the preparation of the ultraviolet curable resin composition of the present invention, according to the presence or absence of the polymerization initiator. When the polymerization initiator is not used, it is preferred to mix the components to satisfy that [mole number of thiol group included in component (A)]/[mole number of carbon-carbon double bond included in component (D)] (mole ratio) is from 0.9 to 1.1, and more preferably it is adjusted to 1.0. When the mole ratio is less than 0.9, a carbon-carbon double bond remains after ultraviolet ray curing, and the weather resistance tends to decline. When it exceeds 1.1, a thiol group remains and a strong odor may be released in some cases due to the decomposition.

On the other hand, when the polymerization initiator is used, it is preferred to mix the components to satisfy that [mole number of thiol group included in component (A)]/[mole number of carbon-carbon double bond included in component (D)] (mole ratio) is from 0.01 to 1.1. When the mole ratio is less than 0.01, the amount of the component (A) may be too little to obtain the intended effects of the present invention. Furthermore, a carbon-carbon double bond is apt to remain intact, and weather resistance of the cured product tends to decline. When it exceeds 1.1, a thiol group remains, and a strong odor may be released in some cases due to the decomposition.

In order to prevent such an inconvenience that functional groups having a carbon-carbon double bond are polymerized among themselves, prior to a reaction of a functional group having a carbon-carbon double bond with a thiol group, the component (D) with an allyl group as the functional group is preferred. Examples of a compound having a single allyl group include cinnamic acid, monoallyl cyanurate, monoallyl isocyanurate, pentaerythritol monoallyl ether, trimethylolpropane monoallyl ether, glycerin monoallyl ether, bisphenol A monoallyl ether, bisphenol F monoallyl ether, ethylene glycol monoallyl ether, diethylene glycol monoallyl ether, triethylene glycol monoallyl ether, propylene glycol monoallyl ether, dipropylene glycol monoallyl ether and tripropylene glycol monoallyl ether. Examples of a compound having two allyl groups include diallyl phthalate, diallyl isophthalate, diallyl cyanurate, diallyl isocyanurate, pentaerythritol diallyl ether, trimethylolpropane diallyl ether, glycerin diallyl ether, bisphenol A diallyl ether, bisphenol F diallyl ether, ethylene glycol diallyl ether, diethylene glycol diallyl ether, triethylene glycol diallyl ether, propylene glycol diallyl ether, dipropylene glycol diallyl ether and tripropylene glycol diallyl ether. Examples of a compound having at least three allyl groups include triallyl isocyanurate, pentaerythritol triallyl ether, pentaerythritol tetraallyl ether and trimethylolpropane triallyl ether. These compounds can be used alone or in combination. Among others, particularly preferred compounds are triallyl isocyanurate, diallyl phthalate and pentaerythritol triallyl ether.

It is also possible to use as the component (D) a compound with a higher molecular weight than the above compounds. The ultraviolet curable resin composition using the compound with a high molecular weight tends to give a cured product with enhanced flexibility. Examples of the compound with a high molecular weight include a copolymer comprising methylallylsiloxane and dimethylsiloxane, copolymer comprising epichlorohydrin and allylglycidyl ether (such as "Epichlomer" (trade name) manufactured by Daiso Co. Ltd. and "Gechron" (trade name) manufactured by Zeon Corp.) and an allyl terminated polyisobutylene polymer ("Epion" (trade name) manufactured by Kaneka Corp.). These compounds can be used alone or in combination of at least two kinds.

It is preferred in using the component (D) that [mole number of carbon-carbon double bond included in component (D)]/[mole number of component (D)] (mole ratio: mean number of carbon-carbon double bond per molecule) is at least 2. When the mole ratio is less than 2, curability of the ultraviolet curable resin composition declines and also crosslinking density of the resultant cured product becomes low, resulting in decline in the physical properties of the cured product, such as heat resistance and surface hardness.

The polymerization initiator usable for preparation of the ultraviolet curable resin composition is not particularly limited, and conventionally known initiators, such as a photocation initiator and photoradical initiator, can be selected arbitrarily. The photocation initiator is exemplified by a compound that generates acid upon irradiation of ultraviolet rays, such as a sulfonium salt, iodonium salt, metallocene compound and benzoin tosylate. The commercially available photocation initiator include Cyracure UVI-6970, Cyracure UVI-6974 and Cyracure 6990 (trade name: all manufactured by US Union Carbide Corp.), Irgacure 264 (manufactured by Ciba Specialty Chemicals) and CIT-1682 (manufactured by Nippon Soda Co. Ltd.). The amount of the photocation polymerization initiator to be used is said to be commonly at most 10 parts by weight, preferably from 1 to 5 parts by weight, based on 100 parts by weight of the composition. The commercially available photoradical initiator is exemplified by Darocure 1173, Irgacure 651, Irgacure 184 and Irgacure 907 (trade name: all manufactured by Ciba Specialty Chemicals) and benzophenone. The amount of the photoradical initiator to be used is said to be about at most 15 parts by weight, preferably from 1 to 15 parts by weight, based on 100 parts by weight of the composition. Incidentally, it is not recommended to use a photoreaction initiator or photosensitizing agent, when weather resistance of the resultant cured product is likely to decline, particularly when the material is used for optical members requiring high weather resistance and transparency.

It is also possible to add a compound which suppresses the ene-thiol reaction, in order to enhance the stability of the ultraviolet curable resin composition. Examples of the compound include phosphorus compounds such as triphenylphosphine and triphenyl phosphite; radical polymerization inhibitors such as p-methoxyphenol, hydroquinone, pyrogallol, naphthylamine, tert-butylcatechol, cuprous chloride, 2,6-di-tert-butyl-p-cresol, 2,2'-methylenebis(4-ethyl-6-tert-butylphenol), 2,2'-methylenebis(4-methyl-6-tert-butylphenol) N-nitrosophenylhydroxylamine aluminum salt and diphenylnitrosoamine; tertiary amines such as benzyldimethylamine, 2-(dimethylaminomethyl)phenol, 2,4,6- tris(diaminomethyl)phenol and diazabicyclo undecene; and imidazoles such as 2-methylimidazole, 2-ethyl-4-methylimidazole, 2-ethylhexylimidazole, 2-undecylimidazole and 1-cyanoethyl-2-methylimidazole.

Among phosphorus compounds, triphenyl phosphite is preferred because the suppression effect against the ene-thiol reaction is high and the handling is easy with its liquid form at room temperature. The amount of the compound added to the ultraviolet curable resin composition is preferably about 0.1 to 10 parts by weight based on 100 parts by weight of the composition. When it is less than 0.1 parts by weight, the suppression effect against the ene-thiol reaction is insufficient, while when it exceeds 10 parts by weight, the amount remaining in the resultant cured product increases and the physical properties tend to decline.

Among the radical polymerization inhibitors, a nitrosophenylhydroxylamine aluminum salt is preferred since it has high suppression effect against the ene-thiol reaction even in a small amount, and also the resultant cured product excels in color tone. The amount of the compound added to the ultraviolet curable resin composition is preferably about 0.0001 to 0.1 parts by weight based on 100 parts by weight of the composition. When it is less than 0.0001 parts by weight, the suppression effect against the ene-thiol reaction is insufficient, while when it exceeds 0.1 parts by weight, the ultraviolet ray curing property tends to decline.

Among tertiary amines, benzyldimethylamine is preferred because the suppression effect against the ene-thiol reaction is high even in a small amount, and the handling is easy with its liquid form at room temperature. The amount of the compound added to the ultraviolet curable resin composition is preferably about 0.001 to 5 parts by weight based on 100 parts by weight of the composition. When it is less than 0.001 parts by weight, the suppression effect against the ene-thiol reaction is insufficient, while when it exceeds 5 parts by weight, an unreacted hydroxyl group and an alkoxy group in the component (A) tend to be subjected to a condensation reaction and to be gelatinized.

The concentration of the active components (A) and (D) in the ultraviolet curable resin composition can be properly determined according to the application, and a solvent can be added if necessary. As the solvent, conventionally known solvents are used arbitrarily. When the ultraviolet curable resin composition is used as a coating agent, it is diluted with a solvent until the intended viscosity is obtained. When the ultraviolet curable resin composition is cured into a thick film of at least 1 mm, or when it is used as an adhesive, it is preferred that the total concentration of the component (A) and (D) is adjusted to at least 90% by weight, and more preferably at least 95% by weight. The total concentration can be calculated either from the concentration of the component (A) and (D) and the amount of a solvent to be added when the ultraviolet curable resin composition is fed, or from the weight change of the ultraviolet curable resin composition before and after heating it at a higher temperature than the boiling point of the solvent included therein for about 2 hours. When the concentration is less than 90% by weight, the composition tends to make bubbles upon curing or molding, or the solvent remains in the cured product, and thereby the physical properties tend to decline. Incidentally, since a solvent is used when the component (A) is synthesized, the solvent may be volatilized so as for the content of a nonvolatile matter to be at least 90% by weight after completion of a reaction in this application. It is also possible to increase the total concentration of the active components (A) and (D) by volatilizing the solvent to be used after preparing the ultraviolet curable resin composition.

The essential components of the ultraviolet curable resin composition are the component (A) prepared as above and the component (D). However, another aspect of the present invention give a component which is prepared by hydrolyzing the component (a1) and a given component (a2) in the presence of formic acid, followed by subjecting it to a condensation reaction in the presence of a solvent and the component (ID). The conditions such as a reaction temperature, reaction time and kind of a solvent are the same as in the case of the component (A).

In the ultraviolet curable resin composition, the component (E) can be mixed depending on the applications. As the component (E), the component (a1) used for synthesis of the component (A) can be used as it is, or the hydrolysate can be used, or both of them can be used in combination. There is an advantage of enhancing adhesiveness, when the ultraviolet curable resin composition including the component (E) is used as a coating agent for inorganic substrates such as glass and metals. The amount of the component (E) to be mixed is preferably about from 0.1 to 20 parts by weight based on 100 parts by weight of the composition. When the amount is less than 0.1 parts by weight, the adhesiveness improving effect of the ultraviolet curable resin composition tends to be insufficient for the inorganic substrates. When it exceeds 20 parts by weight, the ultraviolet curable resin composition tends to fail to be cured in a thick film form, or the resultant cured product tends to be brittle, because volatile components increase upon hydrolysis reaction or condensation reaction of the component (E). As the component (E), 3-mercaptopropyltrimethoxysilane is particularly preferred in terms of adhesiveness improving effect.

In the ultraviolet curable resin composition, the component (B) can be mixed according to the application. As the component (B), conventionally known compounds having an epoxy group can be used. There is such an advantage as enhancing the adhesiveness furthermore when the ultraviolet curable resin composition including the component (B) is used as a coating agent for organic substrates such as plastic. The component (B) reacts with a thiol group in the component (A), and integrated into the cured product by a chemical bond. This works advantageously as suppressing the decline of the physical properties, such as heat resistance, of the cured product. A compound having at least two epoxy groups is more preferred, since the crosslinking density with the component (A) becomes higher and decline of the physical properties is minimized. It is preferred that the amount of the component (B) to be mixed is about 0.1 to 20 parts by weight based on 100 parts by weight of the ultraviolet curable resin composition, and that the component (B) is mixed satisfying that [mole number of thiol group included in component (A)]/[sum of mole number of carbon-carbon double bond included in component (ID) and mole number of epoxy group included in component (B)] (mole ratio) is about 0.9 to 1.1, and more preferably 1.0. When the mole ratio is less than 0.1 parts by weight, the adhesiveness improving effect for an organic substrate tends to be insufficient. When it exceeds 20 parts by weight, the storage stability of the ultraviolet curable resin composition or the ultraviolet ray curing property tend to decline. As the composition (B), a bisphenol A-type epoxy resin is particularly preferred, since it has two epoxy groups and is easily procured.

In the ultraviolet curable resin composition, the component (F) can be added according to the application. As the component (F), the metal alkoxides used for synthesis of the component (A) can be used as it is, or the hydrolysate can be used, or both of them can be used in combination. By using the ultraviolet curable resin composition including the component (F), a refractive index of the resultant cured product can be adjusted. When the ultraviolet curable resin composition is used as a coating agent with a high refractive index, alkoxytitaniums and alkoxyzirconiums are preferred as the component (F). It is preferred that the amount of the component (F) to be mixed is about from 0.1 to 20 parts by weight based on 100 parts by weight of the ultraviolet curable resin composition. When the amount is less than 0.1 parts by weight, the refractive index improving effect tends to be insufficient. When it exceeds 20 parts by weight, the ultraviolet curable resin composition tends to make bubble or generate a warp or crack upon curing, or the resultant cured product becomes brittle, because volatile components increase when the component (F) is hydrolyzed or condensed.

It is also possible to add a plasticizer, weatherproof agent, antioxidant, thermal stabilizer, lubricant, antistatic agent, brightening agent, colorant, conductive agent, mold release agent, surface treatment agent, viscosity adjusting agent and/or filler to the ultraviolet curable resin composition, according to need, within a scope of not damaging the effect of the present invention.

In order to prepare an intended cured product using the ultraviolet curable resin composition thus obtained, the composition is coated on a predetermined substrate or filled in a predetermined mold form, the solvent is volatilized in case of containing a solvent, and ultraviolet rays are irradiated. The volatilization method of the solvent may be properly determined according to such factors as the kind of the solvent, amount and film thickness. However, the volatilization is likely to be done under such conditions as heating at about 40 to 150° C., preferably from 60 to 100° C., under atmospheric pressure or reduced pressure for about 5 second to 2 hours. The irradiance of ultraviolet rays may be properly determined according to such factors as the kind of the ultraviolet curable resin composition and film thickness. However, it may be irradiated such that the cumulative intensity is about from 50 to 10,000 mJ/cm$^2$. When the composition is coated or filled to form a thick film, it is preferred that a photoreaction initiator or photosensitizer is added to the composition as stated above, so as to enhance the photocurability.

It is possible to enhance the physical properties of the cured product furthermore by further heating the cured product obtained by irradiation of ultraviolet rays. The heating method may be properly determined, but it is likely to be done under such conditions as heating at about 40 to 300° C., preferably from 100 to 250° C., for about 1 minute to 6 hours.

(Application to Coating Agent)

A coating layer is formed by means of coating a curable resin composition onto a substrate, followed by curing the coat with heat or ultraviolet rays. As the substrate, various known materials can be properly selected for the use, such as inorganic substrates such as glass, iron, aluminum, copper and ITO; and organic substrate such as PE, PP, PET, PEN, PMMA, PSt, PC and ABS. As stated above, it is preferred to add the component (C), when adhesiveness is insufficient upon coating on an inorganic substrate, while it is preferred to added the component (D), when adhesiveness in insufficient upon coating on an organic substrate The coating property can also be enhanced to some extent, by diluting the curable composition in a solvent. By coating the thermosetting composition and curing the coat with heat or ultraviolet rays as above, the coating layer is formed on various articles such as an optical waveguide, polarizing plate, liquid crystal panel, EL panel, PDP panel, OHP film, optical fiber, color filter, optical disk substrate, lens, plastic substrate for a liquid crystal cell, and prism.

An antireflection effect is provided when the refractive index of the cured film prepared from the curable resin composition is higher than that of the substrate The refractive index of the cured film prepared from the curable resin composition can be enhanced by using both the component (a1) and component (a2) or using the metal alkoxides as the component (E), in production of the component (A). Therefore, it is preferred to add a proper amount of the component to the curable resin composition, in case the antireflection effect is required to provide for the coating layer, which is applied to an optical waveguide, polarizing plate, liquid crystal panel, EL panel, PDP panel, OHP film, optical fiber, color filter, optical disk substrate, lens, plastic substrate for a liquid crystal cell, and prism.

(Application to Adhesive)

An intended adhesive layer is prepared by interposing the curable resin composition between predetermined substrates, followed by curing the composition with heat or ultraviolet rays. As the substrate, those used in forming the coating layer can be used. However, it is necessary that at least one face of the substrate transmits heat or ultraviolet rays in order to cure the adhesive layer with heat or ultraviolet rays. It is also preferred to suppress the volatile components in the curable resin composition to less than 10%, preferably less than 5%, or to remove them before pasting the substrates together, so as to prevent the adhesive layer from foaming. The method of adhering the substrates with the curable resin composition is suitable for preparation of such articles as a liquid crystal panel, EL panel, PDP panel, color filter and optical disk substrate, because it gives a bonded article with a transparent adhesive layer.

(Application to Encapsulation Material)

A molded material encapsulated with a transparent cured product is prepared by coating the curable resin composition to form a thick film or filling it in a predetermined mold form, followed by curing the composition with heat or ultraviolet rays. The material is suitable particularly for optical components such as a light emitting device, photodetector, receiving optics, photoelectric transducer conversion element and optical transmission associated part. When the molded cured material is prepared, it is preferred to add a proper amount of photocurable catalyst or photo sensitizer to the composition, or to suppress the content of volatile components in the composition to less than 10%, preferably less than 5%.

(Application to Transparent Board)

A transparent board is prepared by impregnating the curable resin composition in a glass cloth (substrate) and curing it with heat or ultraviolet rays. Various known glass clothes can be properly selected for the use. Although various types of glass clothes obtained from known glass fibers (such as strand, yarn and roving constituted by E glass, C glass or ECR glass) can be used, a glass cloth made from E glass is particularly preferred since the price is low and the procurement excels. The method of impregnating the curable resin composition in the glass cloth is not particularly limited. Various known methods can be employed, and a coating method can also be employed. In order for the resultant transparent board to be colorless and transparent, it is preferred to adjust the difference of the refractive indexes between the cured product prepared from the curable resin composition and the glass cloth to be within 0.05, more preferably within 0.01, and no difference of the refractive indexes between them is the most preferable. It is also possible to enhance the impregnability to the glass cloth by diluting the curable resin composition in a solvent. Incidentally, the amount of the thermosetting resin composition to be used to the glass cloth can be properly determined according to the application of the resultant transparent substrate. It is, however, likely to be from 20 to 500 parts by weight in general based on 100 parts by weight of the glass cloth. The thickness of the resultant transparent substrate is also properly determined according to the application. It is likely to be from 20 μm to 1 mm in general. Since the transparent substrate prepared by impregnating the thermosetting resin composition in the glass cloth and curing it with heat excels in transparency and heat resistance, it is suitable for formation of a coating layer on such articles as an optical waveguide, polarizing plate, liquid crystal panel, EL panel, PDP panel, color filter, optical disk substrate and plastic substrate for a liquid crystal cell.

EXAMPLES

Hereinafter, the present invention will be described specifically by way of Examples and Comparative Examples. In the respective examples, part and % are weight basis if not otherwise specified.

Production Example 1

Production of Condensate (A-1)

In a reaction apparatus equipped with a stirrer, condenser, water distributor, thermometer and nitrogen inlet, 190 parts of 3-mercaptopropyltrimethoxysilane ("SH-6062" (trade name) manufactured by Dow Corning Toray Co. Ltd.), 52.3 parts of ion exchange water ([mole number of water used for hydrolysis reaction]/[mole number of alkoxy group contained in component (a1)](mole ratio)=1.0) and 9.5 parts of 95% formic acid were charged and hydrolyzed at room temperature for 30 minutes. During the reaction, the temperature increased by maximum 22° C. by exothermic heat. After the reaction was over, 287.36 parts of propylene glycol monomethyl ether acetate ("MFG-AC" (trade name) manufactured by Nippon Nyukazai Co. Ltd.) was charged, and the system was heated. When the temperature was raised at 82° C., methanol generated by hydrolysis was beginning to be distilled off. The temperature was raised at 105° C. over 30 minutes, and water generated by condensation reaction was distilled off. The system was reacted at 105° C. for 1.5 hours more, and then depressurized to 150 mmHg at 70° C. Some of remaining methanol, water and propylene glycol monomethyl ether acetate were distilled off, and 385.2 g of a condensate (A-1) was obtained. [mole number of unreacted hydroxyl group and alkoxy group]/[mole number of alkoxy group contained in component (a1)] (mole ratio) was 0.15, and the concentration was 32.0%. The thiol equivalent of the condensate (A-1) was 398 g/eq.

Production Example 2

Production of Condensate (A-2)

In a reaction apparatus of the same kind as Production Example 1, 180 parts of 3-mercaptopropyltrimethoxysilane, 49.55 parts of ion exchange water ([mole number of water used for hydrolysis reaction]/[mole number of alkoxy group contained in component (a1)](mole ratio)=1.0) and 9.00 parts of 95% formic acid were charged and hydrolyzed at room temperature for 30 minutes. During the reaction, the temperature increased by maximum 22° C. by exothermic heat. After the reaction was over, 272.23 parts of toluene was charged, and the system was heated. When the temperature was raised at 72° C., methanol generated by hydrolysis and some of toluene were beginning to be distilled off. The temperature was raised at 75° C. over 20 minutes, and water was distilled off by condensation reaction. The system was reacted at 75° C. for 1 hour more, and then depressurized to 150 mmHg at 70° C. to distill remaining methanol, water and formic acid off. It was further depressurized to 5 mmHg at 70° C. to distill toluene off, and 124.49 parts of a condensate (A-2) was obtained. [mole number of unreacted hydroxyl group and alkoxy group]/[mole number of alkoxy group contained in component (a1)] (mole ratio) was 0.16, and the concentration was 93.7%. The thiol equivalent of the condensate (A-2) was 136 g/eq.

Production Example 3

Production of Condensate (A-3)

In a reaction apparatus of the same kind as Production Example 1, 15.0 parts of 3-mercaptopropyltrimethoxysilane, 5.05 parts of phenyltrimethoxysilane ([mole number of thiol group contained in component (a1)]/[total mole number of respective alkoxy group contained in component (a1) and component (a2)](mole ratio)=0.75, [total mole number of respective alkoxy group contained in component (a1) and component (a2)]/[total mole number of component (a1) and component (a2)]=3), 5.51 parts of ion exchange water ([mole number of water used for hydrolysis reaction]/[total mole number of respective alkoxy group contained in component (a1) and component (a2)](mole ratio)=1.0) and 1.00 part of 95% formic acid were charged and hydrolyzed at room temperature for 30 minutes. During the reaction, the temperature increased by maximum 20° C. by exothermic heat. After the reaction was over, 19.52 parts of toluene was charged, and the system was heated. When the temperature was raised at 72° C., methanol generated by hydrolysis and some of toluene were beginning to be distilled off. The temperature was raised at 75° C. over 20 minutes, and water was distilled off by condensation reaction. The system was reacted at 75° C. for 1 hour more, and then depressurized to 150 mmHg at 70° C. to distill remaining methanol, water and formic acid off. It was further depressurized to 5 mmHg at 70° C. to distill toluene off, and 13.84 parts of a condensate (A-3) was obtained. [mole number of unreacted hydroxyl group and alkoxy group]/[total mole number of respective alkoxy group contained in component (a1) and component (a2)] (mole ratio) was 0.16, and the concentration was 94.0%. The thiol equivalent of the condensate (A-3) was 181 g/eq.

Production Example 4

Production of Condensate (A-4)

In a reaction apparatus of the same kind as Production Example 1, 18.0 parts of 3-mercaptopropyltrimethoxysilane, 2.24 parts of diphenyldimethoxysilane ([mole number of thiol group contained in component (a1)]/[total mole number of component (a1) and component (a2)] (mole ratio)=0.91, [total mole number of respective alkoxy group contained in component (a1) and component (a2)]/[total mole number of component (a1) and component (a2)]=2.9), 5.29 parts of ion exchange water ([mole number of water used for hydrolysis reaction]/[total mole number of respective alkoxy group contained in component (a1) and component (a2)](mole ratio)=1.0) and 0.90 parts of 95% formic acid were charged and hydrolyzed at room temperature for 30 minutes. During the reaction, the temperature increased by maximum 20° C. by exothermic heat. After the reaction was over, 20.23 parts of toluene was charged, and the system was heated. When the temperature was raised at 72° C., methanol generated by hydrolysis and some of toluene were beginning to be distilled off. The temperature was raised at 75° C. over 20 minutes, and water was distilled off by condensation reaction. The system was reacted at 75° C. for 1 hour more, and then depressurized to 150 mmHg at 70° C. to distill remaining methanol, water and formic acid off. It was further depressurized to 5 mmHg at 70° C. to distill toluene off, and 13.84 parts of a condensate (A-4) was obtained. [mole number of unreacted hydroxyl group and alkoxy group]/[total mole number of respective alkoxy group contained in component (a1) and component (a2)] (mole ratio) was 0.16, and the concentration was 93.6%. The thiol equivalent of the condensate (A-4) was 181 g/eq.

Production Example 5

Production of Condensate (A-5)

In a reaction apparatus of the same kind as Production Example 1, 20.0 parts of 3-mercaptopropyltrimethoxysilane, 3.06 parts of ion exchange water ([mole number of water used for hydrolysis reaction]/[mole number of alkoxy group contained in component (a1)](mole ratio)=0.56) and 1.17 parts of 95% formic acid were charged and hydrolyzed at room temperature for 30 minutes. During the reaction, the temperature increased by maximum 20° C. by exothermic heat. After the reaction, 3.30 parts of tetrabutoxyzirconium ("Orgatics ZA-60" (trade name) manufactured by Matsumoto Kosho Co. Ltd.) dissolved in 11.34 parts of n-butanol was charged therein to further conduct hydrolysis reaction at room temperature for 15 minutes. [mole number of thiol group contained in component (a1)]/[total mole number of component (a1) and component (a2)]=0.92, and [total mole number of respective alkoxy group contained in component (a1) and component (a2)]/[total mole number of component (a1) and component (a2)]=3.1. During the reaction, temperature increased by maximum 5° C. by exothermic heat. 45.36 parts of toluene was charged, and the system was heated at 80° C. to conduct condensation reaction for 30 minutes. It was depressurized to 150 mmHg at 70° C. for 2 hours to distill remaining methanol, n-butanol, water and formic acid off the system. 16.82 parts of a condensate (A-5) was obtained. [mole number of unreacted hydroxyl group and alkoxy group]/[mole number of alkoxy group contained in component (a1)] (mole ratio) was 0.12, and the concentration was 83.4%. The thiol equivalent of the condensate (A-5) was 165 g/eq.

Production Example 6

Production of Component (C-1)

In a reaction apparatus equipped with a stirrer, condenser, thermometer and nitrogen inlet, 120 parts of polycarbonate diol ("Nipporan 951 of Nippon Polyurethane Industry Co., Ltd., average molecular weight: 1000) and 58.7 parts of isophorone diisocyanate ([mole number of isocyanate group contained in isophorone diisocyanate]/[mole number of hydroxyl group contained in polycarbonate diol](mole ratio)= 2.2) were charged, and reacted at 90° C. for 4 hours to give a 203 g of component (C-1) condensate. The isocyanate equivalent of the component (C-1) was 620 g/eq.

Production Example 7

Production of Condensate (A-6)

In a reaction apparatus of the same kind as Production Example 1, 190 parts of 3-mercaptopropyltrimethoxysilane, 52.3 parts of ion exchange water ([mole number of water used for hydrolysis reaction]/[mole number of alkoxy group contained in component (a1)](mole ratio)=1.0) and 9.5 parts of 95% formic acid were charged and hydrolyzed at room temperature for 30 minutes. During the reaction, the temperature increased by maximum 22° C. by exothermic heat. After the reaction was over, 287.36 parts of toluene was charged, and the system was heated. When the temperature was raised at 72° C., methanol generated by hydrolysis and some of toluene were beginning to be distilled off. The temperature was raised at 75° C. over 20 minutes, and water was distilled off by condensation reaction. The system was reacted at 75° C. for 1 hour more, and then depressurized to 150 mmHg at 70° C. to distill remaining methanol, water and formic acid off. It was diluted with 200.99 parts of methanol, and 525.11 parts of a condensate (A-6) was obtained. [mole number of unreacted hydroxyl group and alkoxy group]/[mole number of alkoxy group contained in component (a1)] (mole ratio) was 0.14, and the concentration was 23.5%. The thiol equivalent of the condensate (A-6) was 398 g/eq.

Production Example 8

Production of Condensate (A-7)

In a reaction apparatus of the same kind as Production Example 1, 190 parts of 3-mercaptopropyltrimethoxysilane, 52.30 parts of ion exchange water ([mole number of water used for hydrolysis reaction]/[mole number of alkoxy group contained in component (a1)](mole ratio)=1.0) and 9.50 parts of 95% formic acid were charged and hydrolyzed at room temperature for 30 minutes. During the reaction, the temperature increased by maximum 22° C. by exothermic heat. After the reaction was over, 287.36 parts of diethylene glycol dimethyl ether was charged, and the system was heated. When the temperature was raised at 75° C., methanol generated by hydrolysis was beginning to be distilled off. The system was reacted at 75° C. for 30 minutes more, and then depressurized to 150 mmHg at 70° C. to distill remaining methanol, water and formic acid off. 389.44 parts of a condensate (A-7) was obtained. [mole number of unreacted hydroxyl group and alkoxy group]/[mole number of alkoxy group contained in component (a1)] (mole ratio) was 0.14, and the concentration was 31.6%. The thiol equivalent of the condensate (A-7) was 402 g/eq.

Production Example 9

Production of Condensate (A-8)

In a reaction apparatus of the same kind as Production Example 1, 15.0 parts of 3-mercaptopropyltrimethoxysilane, 5.05 parts of phenyltrimethoxysilane (available from Tokyo Chemical Industry Co. Ltd.) ([mole number of thiol group contained in component (a1)]/[total mole number of component (a1) and component (a2)]=0.75, [total mole number of respective alkoxy group contained in component (a1) and component (a2)]/[total mole number of component (a1) and component (a2)]=3), 5.51 parts of ion exchange water ([mole number of water used for hydrolysis reaction]/[total mole number of respective alkoxy group contained in component (a1) and component (a2)](mole ratio)=1.0) and 1.00 part of 95% formic acid were charged and hydrolyzed at room temperature for 30 minutes. During the reaction, the temperature increased by maximum 20° C. by exothermic heat. After the reaction was over, 19.52 parts of propylene glycol monomethyl ether acetate was charged, and the system was heated.

When the temperature was raised at 82° C., methanol generated by hydrolysis was beginning to be distilled off. The temperature was raised at 105° C. over 30 minutes, and water was distilled off by condensation reaction. The system was reacted at 105° C. for 1.5 hours more, and then depressurized to 150 mmHg at 70° C. to distill remaining methanol, water and formic acid off. 25.13 parts of a condensate (A-8) was obtained. [mole number of unreacted hydroxyl group and alkoxy group]/[total mole number of respective alkoxy group contained in component (a1) and component (a2)] (mole ratio) was 0.12, and the concentration was 51.8%. The thiol equivalent of the condensate (A-8) was 329 g/eq.

Production Example 10

Production of Condensate (A-9)

In a reaction apparatus of the same kind as Production Example 1, 18.0 parts of 3-mercaptopropyltrimethoxysilane, 2.24 parts of phenyldimethoxysilane (available from Tokyo Chemical Industry Co. Ltd.) ([mole number of thiol group contained in component (a1)]/[total mole number of component (a1) and component (a2)]=0.91, [total mole number of respective alkoxy group contained in component (a1) and component (a2)]/[total mole number of component (a1) and component (a2)]=2.9), 5.29 parts of ion exchange water ([mole number of water used for hydrolysis reaction]/[total mole number of respective alkoxy group contained in component (a1) and component (a2)](mole ratio)=1.0) and 0.90 parts of 95% formic acid were charged and hydrolyzed at room temperature for 30 minutes. During the reaction, the temperature increased by maximum 20° C. by exothermic heat. After the reaction was over, 20.23 parts of propylene glycol monomethyl ether acetate was charged, and the system was heated. When the temperature was raised at 82° C., methanol generated by hydrolysis was beginning to be distilled off. The temperature was raised at 105° C. over 30 minutes, and water was distilled off by condensation reaction. The system was reacted at 105° C. for 1.5 hours more, and then depressurized to 150 mmHg at 70° C. to distill remaining methanol, water and formic acid off. 29.0 parts of a condensate (A-9) was obtained. [mole number of unreacted hydroxyl group and alkoxy group]/[total mole number of respective alkoxy group contained in component (a1) and component (a2)] (mole ratio) was 0.10, and the concentration was 46.5%. The thiol equivalent of the condensate (A-9) was 316 g/eq.

Production Example 11

Production of Condensate (A-10)

In a reaction apparatus of the same kind as Production Example 1, 12.0 parts of 3-mercaptopropyltrimethoxysilane, 3.60 parts of ion exchange water ([mole number of water used for hydrolysis reaction]/[mole number of alkoxy group contained in component (a1)](mole ratio)=1.0) and 0.67 parts of 95% formic acid were charged and hydrolyzed at room temperature for 30 minutes. During the reaction, the temperature increased by maximum 20° C. by exothermic heat. After the reaction was over, 1.39 parts of tetrabutyl titanate (available from Tokyo Chemical Industry Co. Ltd.) and 20.25 parts of diethylene glycol dimethyl ether were charged, and the system was heated. The temperature was raised at 75° C., and condensation reaction was conducted for 30 minutes. [mole number of thiol group contained in component (a1)]/[total mole number of component (a1) and component (a2)]=0.94, and [total mole number of respective alkoxy group contained in component (a1) and component (a2)]/[total mole number of component (a1) and component (a2)]=3.1. The system was depressurized to 150 mmHg at 70° C. for 1 hour to distill remaining methanol, water and formic acid off. 29.39 parts of a condensate (A-10) was obtained. [mole number of unreacted hydroxyl group and alkoxy group]/[mole number of alkoxy group contained in component (a1)] (mole ratio) was 0.17, and the concentration was 27.8%. The thiol equivalent of the condensate (A-10) was 481 g/eq.

Production Example 12

Production of Condensate (A-11)

In a reaction apparatus of the same kind as Production Example 1, 18.0 part of 3-mercaptopropyltrimethoxysilane, 2.24 parts of phenyldimethoxysilane ([mole number of thiol group contained in component (a1)]/[total mole number of component (a1) and component (a2)]=0.91, [total mole number of respective alkoxy group contained in component (a1) and component (a2)]/[total mole number of component (a1) and component (a2)]=2.9), 5.29 parts of ion exchange water ([mole number of water used for hydrolysis reaction]/[total mole number of respective alkoxy group contained in component (a1) and component (a2)](mole ratio)=1.0) and 0.90 parts of 95% formic acid were charged and hydrolyzed at room temperature for 30 minutes. During the reaction, the temperature increased by maximum 20° C. by exothermic heat. After the reaction was over, 20.23 parts of toluene was charged, and the system was heated. When the temperature was raised at 72° C., methanol generated by hydrolysis and some of toluene were beginning to be distilled off. The temperature was raised at 75° C. over 20 minutes, and water was distilled off by condensation reaction. The system was reacted at 75° C. for 1 hour more, and then depressurized to 150 mmHg at 70° C. to distill remaining methanol, water and formic acid off. The system was further depressurized to 5 mmHg at 70° C. to distill toluene off, and 14.41 parts of a condensate (A-11) was obtained. [mole number of unreacted hydroxyl group and alkoxy group]/[total mole number of respective alkoxy group contained in component (a1) and component (a2)] (mole ratio) was 0.16, and the concentration was 93.6%. The thiol equivalent of the condensate (A-11) was 157 g/eq.

Examples 1 to 15

Production of Thermosetting Composition 10 parts of the condensate (A-1) obtained in the Production Example 1 and 4.40 parts of a bisphenol A-type epoxy resin ("Epicoat 828" (trade name) manufactured by Japan Epoxy Resins Co. Ltd., epoxy equivalent of 370 g/eq) as the component (B) ([mole number of thiol group contained in component (A)]/[mole number of epoxy group contained in component (B)] (mole ratio)=1.0) were mixed, forming a thermosetting composition (F-1). Separately, 10 parts of the condensate (A-1) obtained in the Production Example 1, 2.79 parts of isophorone diisocyanate (available from Tokyo Chemical Industry Co. Ltd., isocyanate equivalent of 111 g/eq, hereinafter called IPDI) as the component (C) ([mole number of thiol group contained in component (A)]/[mole number of isocyanate group contained in component (C)] (mole ratio)=1.0) and 0.013 g of dibutyl tin dilaurate ("Neostan U-100" (trade name) manufactured by Nitto Kasei Co. Ltd.) were mixed, forming a thermosetting composition (F-2). In the same manner, thermosetting compositions (F-3 to F-15) were prepared according to the following Table, using the condensates (A-1 to A-5) obtained in Production Examples 1 to 5.

Denka Industries Co. Ltd.) and 16 parts of the above resin solution were added thereto, forming a thermosetting composition.

TABLE 1

| Ex. No. and Composition No. | Component (A) Kind | Amount to be used (part) | Component (B) Epicoat 828 | Celoxide 2021 | SR-8EG | Component (C) IPDI | C-1 | SH-6062 | ZA-60 | U-100 | Total concentration (Wt %) |
|---|---|---|---|---|---|---|---|---|---|---|---|
| Ex. 1 (F-1)   | A-1 | 10 | 4.40  | —    | —    | —    | —    | —   | —   | —     | 52.7 |
| Ex. 2 (F-2)   | A-1 | 10 | —     | —    | —    | 2.79 | —    | —   | —   | 0.013 | 46.8 |
| Ex. 3 (F-3)   | A-2 | 10 | 12.8  | —    | —    | —    | —    | —   | —   | —     | 96.9 |
| Ex. 4 (F-4)   | A-2 | 10 | —     | 9.21 | —    | —    | —    | —   | —   | —     | 96.3 |
| Ex. 5 (F-5)   | A-2 | 10 | —     | —    | 6.80 | —    | —    | —   | —   | —     | 95.8 |
| Ex. 6 (F-6)   | A-2 | 10 | —     | —    | —    | 8.12 | —    | —   | —   | 0.018 | 96.1 |
| Ex. 7 (F-7)   | A-2 | 10 | —     | —    | —    | —    | 22.6 | —   | —   | 0.033 | 97.8 |
| Ex. 8 (F-8)   | A-2 | 10 | 12.8  | —    | —    | —    | —    | 0.2 | —   | —     | 96.6 |
| Ex. 9 (F-9)   | A-2 | 10 | —     | —    | —    | 8.12 | —    | 0.2 | —   | 0.018 | 96.1 |
| Ex. 10 (F-10) | A-2 | 10 | 12.8  | —    | —    | —    | —    | —   | 0.7 | —     | 95.8 |
| Ex. 11 (F-11) | A-3 | 10 | 9.51  | —    | —    | —    | —    | —   | —   | —     | 96.2 |
| Ex. 12 (F-12) | A-3 | 10 | —     | —    | —    | 6.04 | —    | —   | —   | 0.016 | 95.4 |
| Ex. 13 (F-13) | A-3 | 10 | —     | —    | —    | —    | 16.9 | —   | —   | 0.027 | 97.2 |
| Ex. 14 (F-14) | A-4 | 10 | 10.6  | —    | —    | —    | —    | —   | —   | —     | 96.2 |
| Ex. 15 (F-15) | A-5 | 10 | 10.6  | —    | —    | —    | —    | —   | —   | —     | 91.9 |

In the Table, Celoxide 2021 is an alicyclic epoxy resin (manufactured by Daicel Chemical Industries Ltd.; trade name "Celoxide 2021"; epoxy equivalent of 126 g/eq), and SR-8EG is polyethylene glycol diglycidyl ether (manufactured by Sakamoto Yakuhin Kogyo Co. Ltd.; trade name; epoxy equivalent of 285 g/eq).

Comparative Example 1

Production of Thermosetting Composition 10 parts of pentaerythritol tetrakis(3-mercaptopropionate) ("PEMP" (trade name) manufactured by Sakai Chemical Industry Co. Ltd.) and 16.2 parts of Epicoat 828 were mined, forming a thermosetting composition.

Comparative Example 2

Production of Thermosetting Composition 10 parts of pentaerythritol tetrakis(3-mercaptopropionate), 10.3 parts of isophorone diisocyanate and 0.020 parts of dibutyl tin dilaurate were mixed, forming a thermosetting composition.

Comparative Example 3

Production of Thermosetting Composition

A thermosetting composition for Comparative Example was synthesized according to Example 3 described in Japanese Unexamined Patent Publication No. 2005-290286. Specifically, 8 parts of bisphenol A-type glycidyl ether ("Epicoat 828" (trade name) manufactured by Japan Epoxy Resins Co. Ltd., epoxy equivalent of 190 g/eq) was dissolved in 8 g of tetrahydrofuran, forming a resin solution. Separately, 18 parts of phenyltrimethoxysilane, 8 parts of 3-glycidoxypropyl triethoxysilane, 8 parts of a 10 wt % aqueous formic acid solution and 49 parts of tetrahydrofuran were refluxed at 60° C. for 3 hours with stirring. 1 part of a thermosetting agent ("Adekaopton CP-66" (trade name) manufactured by Asahi (Curability and Surface Hardness of Thermosetting Composition)

The thermosetting compositions prepared in Examples 1 to 15 and Comparative Example 1 and 2 were respectively coated on a glass plate so as to form a film with a thickness of about 15 µm after curing. A solvent drying step and curing reaction were conducted at 80° C. for 2 hours. The curability of the resultant cured products was confirmed by the fact that the thiol peak at around 2,600 cm$^{-1}$ was considerably reduced or almost disappeared in the measurement by means of Raman spectroscopic analysis ("NRS-3100" (trade name) manufactured by JASCO corporation). The surface hardness of the resultant cured products was evaluated according to a pencil hardness test in the General Test Procedures of JIS K-5401.

TABLE 2

|  | Surface hardness |
|---|---|
| Ex. 1 | 4H |
| Ex. 2 | 2H |
| Ex. 3 | 4H |
| Ex. 4 | 3H |
| Ex. 5 | HB |
| Ex. 6 | 2H |
| Ex. 7 | 3B |
| Ex. 8 | 4H |
| Ex. 9 | 2H |
| Ex. 10 | 4H |
| Ex. 11 | 3H |
| Ex. 12 | H |
| Ex. 13 | 3B |
| Ex. 14 | 3H |
| Ex. 15 | 4H |
| Com. Ex. 1 | 2H |
| Com. Ex. 2 | HB |

As is clear from Table 2, the surface hardness of the cured products prepared in Examples is higher than that of the cured products prepared in Comparative Examples, when Comparative Example 1 to Examples 1, 3, 8, 10, 11, 14 and 15, all cured using the component (B), and Comparative Example 2 to Examples 2, 6, 9 and 12, all cured using the component (C), were compared. With the result, it is recognized that the curable composition of the present invention is more suitable as a hard coat agent.

(Weather Resistance of Cured Film)

The thermosetting compositions prepared in Examples 3, 4 and 6 and Comparative Example 1 and 2 were respectively coated on a glass plate so as to form a film with a thickness of about 15 μm after curing. A solvent drying step and curing reaction were conducted at 80° C. for 2 hours. Using an ultraviolet irradiation apparatus ("UV-152" (trade name) manufactured by Ushio Inc.), ultraviolet rays were irradiated on the resultant cured products such that the cumulative intensity became 20,000 mJ/cm$^2$ at 365 nm by means of a UV detector. After irradiation, the stain level was evaluated by visual observation. The cured products were heated at 200° C. for 30 minutes, and the stain level after heating was also evaluated by visual observation. The criteria are as follows.

OK: almost not stained (or not-colored)
Δ: slightly stained (somewhat yellow)
NG: darkly stained (brown)

TABLE 3

|  | Ex. 3 | Ex. 4 | Ex. 6 | Com. Ex. 1 | Com. Ex. 2 |
|---|---|---|---|---|---|
| Weather resistance (UV resistance) | Δ | OK | OK | NG | Δ |
| Heat and yellowing resistance | Δ | OK | OK | NG | Δ |

As is clear from Table 3, the cured product prepared in Comparative Example 1 was stained brown, while coloration of the cured product of Example 3 was suppressed. It is also found that the cured products of Example 4 and 6 showed almost no coloration against both ultraviolet irradiation and heat. The results show the cured products of the present invention excel in weather resistance.

(Adhesiveness to Inorganic Materials)

The thermosetting compositions prepared in Examples 3, 6, 8 and 9 were respectively coated on various inorganic substrates so as to form a film with a thickness of about 15 μm after curing. A solvent drying step and curing reaction were conducted at 80° C. for 2 hours. The resultant cured products were evaluated according to a cross-cut cellophane tape peeling test in the General Test Procedures of JIS K-5400.

As is clear from Table 2 and Table 4, when the cured products of Examples 8 and 9, prepared by mixing the component (E), were compared to those of Examples 3 and 6, the curability and surface hardness were equal, but the adhesiveness to an inorganic substrate considerably improved. Thus, it is recognized that the thermosetting compositions prepared in Examples 8 and 9 are suitable as a coating agent for such articles as an optical waveguide, polarizing plate, liquid crystal panel, EL panel, PDP panel, optical fiber, color filter, optical disk substrate, lens and prism.

TABLE 4

|  | Ex. 3 | Ex. 6 | Ex. 8 | Ex. 9 |
|---|---|---|---|---|
| steel plate | 0/100 | 0/100 | 100/100 | 100/100 |
| glass plate | 0/100 | 100/100 | 100/100 | 100/100 |
| copper plate | 100/100 | 100/100 | 100/100 | 100/100 |

(Refractive Index)

The thermosetting compositions prepared in Examples 3 to 6, 10, 11 and 15 were respectively diluted with propylene glycol monomethyl ether acetate in such a way that the nonvolatile components account for 30% by weight. The compositions were coated on a silicon substrate respectively so as to form a film with a thickness of about 50 nm after curing. A solvent drying step and curing reaction were conducted at 80° C. for 30 minutes. Separately, the thermosetting composition prepared in Comparative Example 3 was diluted with propylene glycol monomethyl ether acetate in such a way that the nonvolatile components account for 30% by weight. The composition was coated on a silicon substrate so as to form a film with a thickness of about 50 nm after curing. The solvent was dried at 60° C. for 10 minutes, followed by thermocuring at 120° C. for 30 minutes. The refractive index of the resultant cured products was measured using an ellipsometer ("ESM-1" (trade name) manufactured by Ulvac Inc.).

TABLE 5

|  | Ex. 3 | Ex. 4 | Ex. 5 | Ex. 6 | Ex. 10 | Ex. 11 | Ex. 15 | Com. Ex. 3 |
|---|---|---|---|---|---|---|---|---|
| Refractive Index | 1.57 | 1.55 | 1.53 | 1.56 | 1.63 | 1.57 | 1.63 | 1.53 |

As is clear from Table 5, it is found that the cured product of Example 15 in which zirconium was mixed as the component (a2), and the cured product of Example 10 in which titanate was mixed as the component (F) have an improved refractive index, as compared to the cured products of Examples 3, 4, 5, 6 and 11. Thus, it is recognized that the thermosetting compositions prepared in Examples 10 and 15 are suitable as a coating agent forming an antireflection film, for such articles as an optical waveguide, polarizing plate, liquid crystal panel, EL panel, PDP panel, OHP film, optical fiber, color filter, optical disk substrate, lens, plastic substrate for liquid crystal cell and prism.

(Preparation of Transparent Board)

The compositions prepared in Examples 4 and 6 were cured, and impregnated in a commercially available glass cloth (Clipper Glass Cloth Micro B, film thickness of 28 μm, refractive index of 1.54) in such a way that (weight of glass cloth)/(weight of composition) satisfies 100/200. It was subjected to solvent drying and curing reaction at 80° C. for 2 hours. A transparent board of 80 μm thick was obtained. Separately, the composition prepared in Comparative Example 3 was impregnated in a glass cloth. After volatilizing the solvent in a drier at 60° C., the remaining matter was heated at 120° C. for 3 hours, and subjected to press molding at 150° C. for 1 hour. A transparent board of 80 μm thick was obtained. The outer appearance of the resultant transparent boards was evaluated by visual observation. The criteria are as follows.

OK: virtually transparent
Δ: translucent
NG: opaque

The flexibility of the transparent substrate was evaluated by a curvature radius at which a crack is generated upon bending the substrate.

TABLE 6

|  | Ex. 4 | Ex. 6 | Com. Ex. 3 |
|---|---|---|---|
| transparency | OK | OK | OK |
| flexibility | <1 cm | 1 cm | 5 cm |
| difference in refractive index between cured matter and glass cloth | 0.01 | 0.02 | 0.01 |

As is clear from Table 6, any of the resultant board substrates were virtually transparent. The transparent substrate of Comparative Example 3 generated a crack when the curvature radius became less than 5 cm, while that of Example 6 generated a crack when the curvature radius became less than 1 cm, and that of Example 4 did not generate a crack even the boards was bent more. Thus, it is recognized that the transparent boards of Examples are more suitable as a substrate for a flexible liquid crystal panel, EL panel, PDP panel and color filter.

(Heat Resistance)

Figure 2:
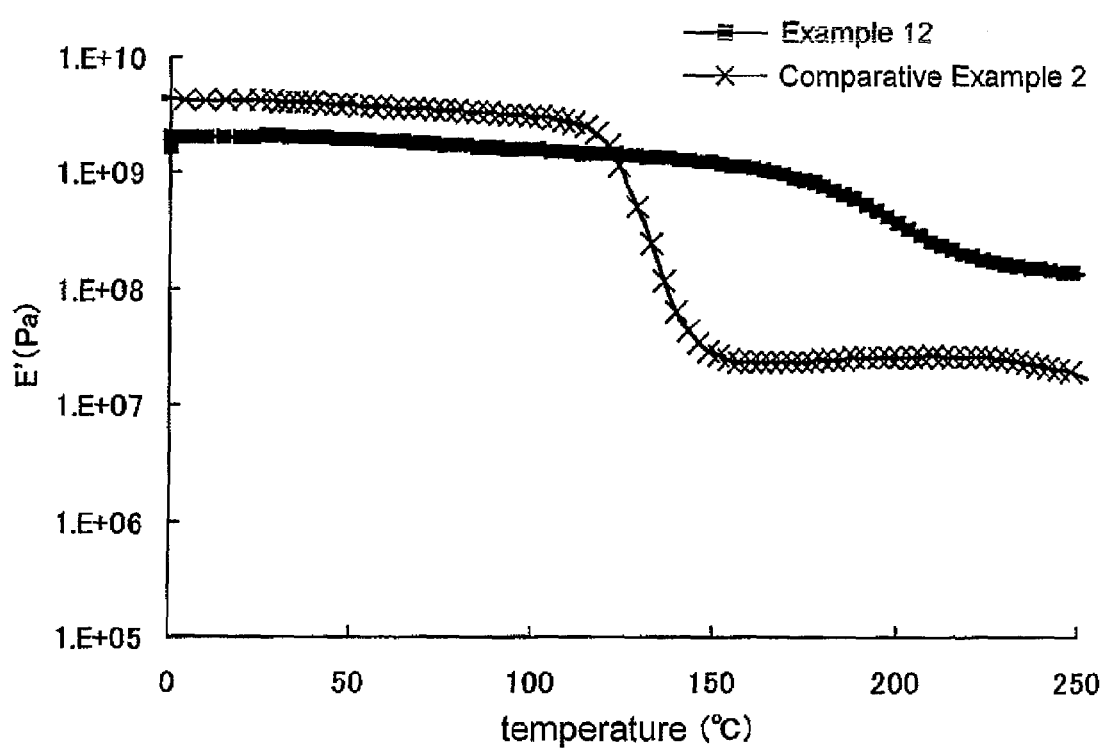
FIG. 2 shows correlation of temperature and dynamic storage elastic modulus of cured products obtained from compositions of Example 12 and Comparative Example 2.

The thermosetting compositions prepared in Examples 3 and 12, and Comparative Examples 1 and 2 were respectively poured in an aluminum cup so as to form a film of about 1 mm thick after curing. A solvent drying step and curing reaction were conducted at 80° C. for 2 hours. The resultant cured products were further heated in a dryer at 200° C. for 30 minutes. The cured product was cut into 5 mm×25 mm, and the dynamic storage elastic modulus was measured by a viscoelasticity measurement instrument ("DMS6100" (trade name) manufactured by Seiko Instruments Inc., measurement conditions: frequency of 1 Hz, slope of 3° C./min) to evaluate the heat resistance. The measurement results are shown in FIG. 1 and FIG. 2. As is clear from FIG. 1 and FIG. 2, it is recognized that Example 3 and 12 have improved Tg, have less decline in the elastic modulus at a high temperature and excel in heat resistance, as compared to Comparative Example 1 and 2, respectively. In the Comparative Example 1, the elastic modulus decreased lower than the measuring limit ($10^6$).

(Linear Expansion Coefficient)

The thermosetting compositions prepared in Examples 3 and 12, and Comparative Examples 1 and 2 were respectively poured in an aluminum cup so as to form a film of about 1 mm thick after curing. A solvent drying step and curing reaction were conducted at 80° C. for 2 hours. The resultant cured products were further heated in a dryer at 200° C. for 30 minutes. The linear expansion coefficient of the resultant cured products was measured at 120 to 150° C. by a thermal stress strain measurement instrument ("TMA120C" (trade name) manufactured by Seiko Instruments Inc.). The results are shown in Table 7.

TABLE 7

|  | Ex. 3 | Ex. 12 | Com. Ex. 1 | Com. Ex. 2 |
| --- | --- | --- | --- | --- |
| linear expansion coefficient ($\times 10^6/°$ C.) | 170 | 105 | 210 | 140 |

When Comparative Example 1 and Example 3, both prepared by using the component (B), and Comparative Example 2 and Example 12, both prepared by using the component (C) are compared, it is found that the linear expansion coefficient of the cured products prepared in Examples is lower than that of the cured products prepared in Comparative Examples. Thus, it is recognized that the curable compositions of the present invention are suitable as an optical waveguide, polarizing plate, liquid crystal panel, EL panel, PDP panel, color filter, optical disk substrate or plastic substrate for a liquid crystal cell, which require thermal stability.

(Water Absorbance)

The thermosetting compositions prepared in Examples 3 and 12, and Comparative Examples 1 and 2 were respectively poured in an aluminum cup so as to form a film of about 1 mm thick after curing. A solvent drying step and curing reaction were conducted at 80° C. for 2 hours. The resultant cured products were further heated in a dryer at 200° C. for 30 minutes. The water absorbance of the resultant cured products was calculated from a difference between the weight measured after allowing the cured product stand in a thermostatic tank at 50° C. for 24 hours and that measured after impregnating it in a thermostatic water tank at 23° C. for 24 hours. The results are shown in Table 8.

TABLE 8

|  | Ex. 3 | Ex. 12 | Com. Ex. 1 | Com. Ex. 2 |
| --- | --- | --- | --- | --- |
| water absorbance 24 h (%) | 0.6 | 0.9 | 0.5 | 0.8 |

As is clear from Table 8, it is found that the water absorbance of the cured products in Examples 3 and 12 is in the same range as that of the cured products in Comparative Example 1 and 2.

(Chemical Resistance)

The thermosetting compositions prepared in Examples 3 and 12, and Comparative Examples 1 and 2 were respectively poured in an aluminum cup so as to form a film of about 1 mm thick after curing. A solvent drying step and curing reaction were conducted at 80° C. for 2 hours. The resultant cured products were further heated in a dryer at 200° C. for 30 minutes. The resultant cured products were impregnated in a solvent (methanol, toluene, THF or DMF) for 3 hours, and the outer appearances were visually observed. The swelling degree was also calculated from a difference in measuring weight before and after impregnation (calculation method: (weight after impregnation−weight before impregnation)/weight before impregnation×100, making 0% in case of no absorption found). The results are shown in Table 9.

TABLE 9

|  |  | Ex. 3 | Ex. 12 | Com. Ex. 1 | Com. Ex. 2 |
| --- | --- | --- | --- | --- | --- |
| methanol | outer appearance | not particular | not particular | not particular | not particular |
|  | swelling degree | 0 | 0 | 0 | 0 |
| toluene | outer appearance | not particular | not particular | not particular | not particular |
|  | swelling degree | 0 | 0 | 0 | 0 |
| THF | outer appearance | not particular | not particular | swelling | not particular |
|  | swelling degree | 0.3 | 0.7 | 35 | 5.3 |
| DMF | outer appearance | not particular | not particular | swelling and peeling | swelling and peeling |
|  | swelling degree | 0.5 | 1.3 | 17 | 23 |

As is clear from Table 9, it is found that the cured products prepared from the thermosetting compositions of Examples 3 and 12 excel in solvent resistance as compared to those prepared from the thermosetting compositions of Comparative Examples 1 and 2.

Examples 16 to 35

Production of Ultraviolet Curable Resin Composition 2.09 parts of triallyl isocyanurate ("Taic" (trade name) manufactured by Nippon Chemical Industry Co. Ltd., [mole number of carbon-carbon double bond contained in component (D)]/[mole number of component (D)]=3) ([mole number of thiol group contained in component (A)]/[mole number of carbon-carbon double bond contained in component (D)] (mole ratio)=1.0) and 0.20 parts of triphenyl phosphite (available from Tokyo Chemical Industries Co. Ltd.) were mixed in 10 parts of the condensate (A-1) prepared in Production Example 1, forming an ultraviolet curable resin composition (G-1). In the same manner, ultraviolet curable resin compositions (G-2 to G-20) were prepared according to Table 10, using the condensates (A-1 to A-3, A-6 to A-11) prepared in Production Example 1 to 3 and 7 to 12.

tained in component (a1) and component (a2)] (mole ratio) =1.0) and 1.67 parts of 95% formic acid were charged, and subjected to hydrolysis reaction at room temperature for 30 minutes. During the reaction, the temperature increased by maximum 26° C. by exothermic heat. After the reaction was over, 50.54 parts of toluene was charged, and the system was heated. When the temperature was raised at 72° C., methanol generated by hydrolysis and some of toluene were beginning to be distilled off. The temperature was raised at 75° C. over 1 hour, and water was distilled off by condensation reaction. After adding 10.58 g of triallyl isocyanurate, the system was depressurized to 150 mmHg at 70° C. to distill remaining

TABLE 10

| Ex. No. and Composition No. | Component (A) kind | amount to be used (part) | Component (D) TAIC | DAP | P-30M | SH-6062 | tetrabutoxy-titanium | SR-8EG | Epicoat 828 | triphenyl phosphite | benzyldi-methylamine | Q-1301 | total concentration (Wt %) |
|---|---|---|---|---|---|---|---|---|---|---|---|---|---|
| Ex. 16 (G-1)  | A-1  | 10 | 2.09 | —    | —    | —    | —    | —    | —    | 0.20 | —    | —      | 43.0 |
| Ex. 17 (G-2)  | A-1  | 10 | —    | 3.09 | —    | —    | —    | —    | —    | 0.20 | —    | —      | 43.3 |
| Ex. 18 (G-3)  | A-1  | 10 | —    | —    | 2.15 | —    | —    | —    | —    | 0.20 | —    | —      | 47.3 |
| Ex. 19 (G-4)  | A-6  | 10 | 1.53 | —    | —    | —    | —    | —    | —    | 0.20 | —    | —      | 33.0 |
| Ex. 20 (G-5)  | A-7  | 10 | 2.06 | —    | —    | —    | —    | —    | —    | 0.20 | —    | —      | 42.6 |
| Ex. 21 (G-6)  | A-8  | 10 | 2.53 | —    | —    | —    | —    | —    | —    | 0.20 | —    | —      | 60.6 |
| Ex. 22 (G-7)  | A-9  | 10 | 2.63 | —    | —    | —    | —    | —    | —    | 0.20 | —    | —      | 56.4 |
| Ex. 23 (G-8)  | A-10 | 10 | 1.73 | —    | —    | —    | —    | —    | —    | 0.20 | —    | —      | 52.1 |
| Ex. 24 (G-9)  | A-2  | 10 | 6.12 | —    | —    | —    | —    | —    | —    | 0.20 | —    | —      | 94.9 |
| Ex. 25 (G-10) | A-2  | 10 | —    | 9.07 | —    | —    | —    | —    | —    | 0.20 | —    | —      | 95.0 |
| Ex. 26 (G-11) | A-2  | 10 | —    | —    | 6.29 | —    | —    | —    | —    | 0.20 | —    | —      | 95.7 |
| Ex. 27 (G-12) | A-3  | 10 | 4.59 | —    | —    | —    | —    | —    | —    | 0.20 | —    | —      | 94.8 |
| Ex. 28 (G-13) | A-11 | 10 | 5.29 | —    | —    | —    | —    | —    | —    | 0.20 | —    | —      | 95.8 |
| Ex. 29 (G-14) | A-1  | 10 | 2.15 | —    | —    | 0.20 | —    | —    | —    | 0.20 | —    | —      | 43.6 |
| Ex. 30 (G-15) | A-1  | 10 | 2.06 | —    | —    | —    | 0.56 | —    | —    | 0.20 | —    | —      | 42.2 |
| Ex. 31 (G-16) | A-1  | 10 | 1.72 | —    | —    | —    | —    | 0.46 | —    | 0.20 | —    | —      | 43.5 |
| Ex. 32 (G-17) | A-1  | 10 | 1.93 | —    | —    | —    | —    | —    | 0.43 | 0.20 | —    | —      | 45.3 |
| Ex. 33 (G-18) | A-2  | 10 | 4.59 | —    | 1.57 | —    | —    | —    | —    | 0.20 | —    | —      | 95.1 |
| Ex. 34 (G-19) | A-2  | 10 | 6.12 | —    | —    | —    | —    | —    | —    | —    | 0.02 | —      | 94.9 |
| Ex. 35 (G-20) | A-2  | 10 | 6.12 | —    | —    | —    | —    | —    | —    | —    | —    | 0.0003 | 94.9 |

In the Table, DAP is diallyl phthalate ("Daiso Dap Monomer" (trade name) manufactured by Daiso Co. Ltd., [mole number of carbon-carbon double bond contained in component (D)]/[mole number of component (D)]=2); P-30M is pentaerythritol triallyl ether ("Neoallyl P-30M" (trade name) manufactured by Daiso Co. Ltd., [mole number of carbon-carbon double bond contained in component (D)]/[mole number of component (D)]=3); SH-6062 is 3-mercaptopropyltrimethoxysilane (trade name, manufactured by Dow Corning Toray Co. Ltd.); SR-8EG is polyethylene glycol diglycidyl ether (trade name, manufactured by Sakamoto Yakuhin Kogyo Co. Ltd., epoxy equivalent of 285 g/eq); Epicoat 828 is bisphenol A-type liquid epoxy resin (trade name, manufactured by Japan Epoxy Resins Co. Ltd., epoxy equivalent of 189 g/eq); and Q-1301 is N-nitrosophenylhydroxylamine aluminum salt (trade name, manufactured by Wako Pure Chemical Industries Ltd.).

Example 36

Production of Ultraviolet Curable Resin Composition

In a reaction apparatus of the same kind as Production Example 1, 25.0 parts of 3-mercaptopropyltrimethoxysilane, 8.42 parts of phenyltrimethoxysilane, 9.18 parts of ion exchange water ([mole number of water used for hydrolysis reaction]/[total mole number of respective alkoxy group contained in component (a1) and component (a2)] (mole ratio) =1.0) and 1.67 parts of 95% formic acid were charged, and subjected to hydrolysis reaction at room temperature for 30 minutes. During the reaction, the temperature increased by maximum 26° C. by exothermic heat. After the reaction was over, 50.54 parts of toluene was charged, and the system was heated. When the temperature was raised at 72° C., methanol generated by hydrolysis and some of toluene were beginning to be distilled off. The temperature was raised at 75° C. over 1 hour, and water was distilled off by condensation reaction. methanol, water and formic acid off. It was further depressurized to 5 mmHg at 70° C. to distill toluene off. 33.97 parts of an ultraviolet curable resin composition (G-21) was obtained. [mole number of unreacted hydroxyl and alkoxy groups]/[total mole number of respective alkoxy group contained in component (a1) and component (a2)] (mole ratio) was 0.14, and the concentration was 95.0%.

Example 37

Production of Ultraviolet Curable Resin Composition

In a reaction apparatus of the same kind as Production Example 1, 25.0 parts of 3-mercaptopropyltrimethoxysilane, 8.42 parts of phenyltrimethoxysilane, 9.18 parts of ion exchange water ([mole number of water used for hydrolysis reaction]/[total mole number of respective alkoxy group contained in component (a1) and component (a2)](mole ratio) 1.0) and 1.67 parts of 95% formic acid were charged, and subjected to hydrolysis reaction at room temperature for 30 minutes, During the reaction, the temperature increased by maximum 26° C. by exothermic heat. After the reaction was over, 50.54 parts of toluene was charged, and the system was heated. When the temperature was raised at 72° C., methanol generated by hydrolysis and some of toluene were beginning to be distilled off. The temperature was raised at 75° C. over 1 hour, and water was distilled off by condensation reaction.

After adding 15.68 parts of diallyl phthalate, the system was depressurized to 150 mmHg at 70° C. to distill remaining methanol, water and formic acid off. It was further depressurized to 5 mmHg at 70° C. to distill toluene off. 39.65 parts of an ultraviolet curable resin composition (G-22) was obtained. [mole number of unreacted hydroxyl and alkoxy groups]/[total mole number of respective alkoxy group contained in component (a1) and component (a2)](mole ratio) was 0.14, and the concentration was 94.2%.

Example 38

Production of Ultraviolet Curable Resin Composition

In a reaction apparatus of the same kind as Production Example 1, 25.0 parts of 3-mercaptopropyltrimethoxysilane, 8.42 parts of phenyltrimethoxysilane, 9.18 parts of ion exchange water ([mole number of water used for hydrolysis reaction]/[total mole number of respective alkoxy group contained in component (a1) and component (a2)](mole ratio) =1.0) and 1.67 parts of 95% formic acid were charged, and subjected to hydrolysis reaction at room temperature for 30 minutes. During the reaction, the temperature increased by maximum 26° C. by exothermic heat. After the reaction was over, 50.54 parts of toluene was charged, and the system was heated. When the temperature was raised at 72° C., methanol generated by hydrolysis and some of toluene were beginning to be distilled off. The temperature was raised at 75° C. over 1 hour, and water was distilled off by condensation reaction. After adding 10.88 parts of pentaerythritol triallyl ether, the system was depressurized to 150 mmHg at 70° C. to distill remaining methanol, water and formic acid off. It was further depressurized to 5 mmHg at 70° C. to distill toluene off. 34.69 parts of an ultraviolet curable resin composition (G-23) was obtained. [mole number of unreacted hydroxyl and alkoxy groups]/[total mole number of respective alkoxy group contained in component (a1) and component (a2)](mole ratio) was 0.14, and the concentration was 93.9%.

Comparative Example 4

Production of Ultraviolet Curable Resin Composition

Dipentaerythritol hexaacrylate ("Beamset-700" (trade name) manufactured by Arakawa Chemical Industries Co. Ltd.) was used as it was.

Comparative Example 5

Production of Ultraviolet Curable Resin Composition 0.5 parts of a photoradical initiator ("Irgacure Irg-184" (trade name) manufactured by Ciba Specialty Chemicals) was mixed in 10 parts of dipentaerythritol hexaacrylate, forming an ultraviolet curable resin composition.

Comparative Example 6

Production of Ultraviolet Curable Resin Composition 6.20 parts of triallyl isocyanurate and 0.20 parts of triphenyl phosphite were mixed in 10 parts of pentaerythritol tetrakis(3-mercaptopropionate)("PEMP" (trade name) manufactured by Sakai Chemical Industry Co. Ltd.), forming an ultraviolet curable resin composition.

Comparative Example 7

Production of Ultraviolet Curable Resin Composition 10.08 parts of diallyl phthalate and 0.20 parts of triphenyl phosphite were mixed in 10 parts of pentaerythritol tetrakis (3-mercaptopropionate), forming an ultraviolet curable resin composition.

Comparative Example 8

Production of Ultraviolet Curable Resin Composition 6.99 parts of pentaerythritol triacrylate and 0.20 parts of triphenyl phosphite were mixed in 10 parts of pentaerythritol tetrakis(3-mercaptopropionate), forming an ultraviolet curable resin composition.

(Curability of Composition)

The ultraviolet curable resin compositions prepared in Examples 16 to 23 and 29 to 33 were respectively coated on a steel plate so as to form a film of about 15 μm thick after curing. The solvent was dried at 120° C. for 30 minutes. After drying, using an ultraviolet irradiation apparatus ("UV-152" (trade name) manufactured by Ushio Inc.), ultraviolet rays were irradiated in such a way that the cumulative intensity became 200 mJ/cm$^2$ at 365 nm by means of a UV detector. In the same manner, the ultraviolet curable resin compositions prepared in Examples 24 to 28 and 34 to 38, and Comparative Example 4 to 8 were respectively coated on a steel plate so as to form a film of about 15 μm thick after curing. Using an ultraviolet irradiation apparatus ("UV-152" (trade name) manufactured by Ushio Inc.), ultraviolet rays were irradiated in such a way that the cumulative intensity became 200 mJ/cm$^2$ at 365 nm by means of a UV detector. The thermosetting composition prepared in Comparative Example 3 was coated on a steel plate so as to form a film of about 15 μm thick after curing, and subjected to a solvent drying step at 60° C. for 30 minutes. It was then cured at 120° C. for 3 hours, followed by at 150° C. for 1 hour. The hardness of the resultant cured products was evaluated according to a pencil hardness test in the General Test Procedures of JIS K-5401.

TABLE 11

|  | surface hardness |
|---|---|
| Ex. 16 | 7H |
| Ex. 17 | 6H |
| Ex. 18 | 4H |
| Ex. 19 | 7H |
| Ex. 20 | 7H |
| Ex. 21 | 6H |
| Ex. 22 | 6H |
| Ex. 23 | 7H |
| Ex. 24 | 7H |
| Ex. 25 | 6H |
| Ex. 26 | 4H |
| Ex. 27 | 6H |
| Ex. 28 | 6H |
| Ex. 29 | 7H |
| Ex. 30 | 7H |
| Ex. 31 | 6H |
| Ex. 32 | 6H |
| Ex. 33 | 5H |
| Ex. 34 | 7H |

TABLE 11-continued

|  | surface hardness |
|---|---|
| Ex. 35 | 7H |
| Ex. 36 | 7H |
| Ex. 37 | 7H |
| Ex. 38 | 4H |
| Com. Ex. 4 | not cured |
| Com. Ex. 5 | half-cured |
| Com. Ex. 6 | 4H |
| Com. Ex. 7 | 3H |
| Com. Ex. 8 | 2H |

As is clear from Table 11, the ultraviolet curable resin composition of Comparative Example 4 was not cured at all, and that of Comparative Example 5 was poorly cured. Accordingly, it is found that a common radical polymerization fails to provide adequate curing without an initiator, and fails to form a cured product in a thick film even if an initiator is added. In contrast, the ultraviolet curable resin compositions of Examples 16 to 38 and Comparative Example 6 to 8 were cured without any problems. It is found from the fact that ultraviolet curing is achievable without an initiator in the curing system using an ene-thiol reaction, and the curing system of the present invention, has curability on the same level as a conventional organic-organic system. Since the cured products of Examples 16 to 36 have higher surface hardness than those of Comparative Example 6 to 8, all of which were cured using the identical component (D), it is recognized that the curable resin compositions of the present invention are suitable as a hard coat agent.

(Stability of Ultraviolet Curable Resin Composition)

The ultraviolet curable resin compositions prepared in Examples 24, 34 and 35 were respectively placed in a brown bottle and allowed to stand at room temperature. The stability of the ultraviolet curable resin compositions were evaluated by the number of days until gelatinization.

TABLE 12

|  | number of days until gelatinization (day) |
|---|---|
| Ex. 24 | 3 days |
| Ex. 34 | 7 days |
| Ex. 35 | longer than 1 month |

As is clear from Table 11 and Table 12, it is found that the ultraviolet curable resin compositions of Example 34 and 35 have equal hardness to the ultraviolet curable resin composition of Example 24, and have considerably improved stability. Therefore, in such applications as specially requiring stability in one-component form, the stability can be enhanced by adding tertiary amines such as benzyldimethylamine and a radical polymerization inhibitor such as a N-nitrosophenylhydroxylamine aluminum salt.

(Weather Resistance of Cured Film)

The ultraviolet curable compositions prepared in Examples 23 to 25 and Comparative Example 5 to 8 were respectively coated on a glass plate so as to form a film of about 5 μm thick after curing. Using the above mentioned ultraviolet irradiation apparatus, ultraviolet rays were irradiated such that the cumulative intensity became 200 mJ/cm$^2$ at 365 nm by means of a UV detector. Ultraviolet rays were further irradiated on the resultant cured products such that the cumulative intensity became 20,000 mJ/cm$^2$. After irradiation, the stain level was evaluated by visual observation. The criteria are as follows.

OK: almost not stained
Δ: slightly stained (somewhat yellow)
NG: darkly stained (brown)

TABLE 13

|  | weather resistance (UV resistance) |
|---|---|
| Ex. 23 | OK |
| Ex. 24 | OK |
| Ex. 25 | OK |
| Com. Ex. 5 | NG |
| Com. Ex. 6 | Δ |
| Com. Ex. 7 | Δ |
| Com. Ex. 8 | Δ |

As is clear from Table 13, the cured product of Comparative Example 5 was stained brown, and the cured products of Comparative Examples 6 to 8 were stained somewhat yellow. On the other hand, the cured products of Example 23 to 25 were virtually not stained. It is found that the cured products of the present invention excel in weather resistance as compared to a conventional organic-organic ene-thiol reaction system.

(Adhesiveness to Inorganic Substrate)

The ultraviolet curable resin compositions prepared in Examples 24 and 29 were respectively coated on various inorganic substrates so as to form a film of about 15 μm thick after curing. Using the above mentioned ultraviolet irradiation apparatus, ultraviolet rays were irradiated such that the cumulative intensity became 500 mJ/cm$^2$ at 365 nm by means of a UV detector. The resultant cured products were evaluated according to a cross-cut cellophane tape peeling test in the General Test Procedures of JIS K-5400.

TABLE 14

|  | Ex. 24 | Ex. 29 |
|---|---|---|
| steel plate | 80/100 | 100/100 |
| glass plate | 0/100 | 100/100 |
| copper plate | 80/100 | 100/100 |

As is clear from Table 11 and Table 14, it is found that the cured product of Example 29 with the component (E) mixed in has equal hardness to that of Example 24, and has improved adhesiveness to an inorganic substrate. Thus, it is recognized that the ultraviolet curable resin composition of Example 29 is suitable as a coating agent for such articles as an optical waveguide, polarizing plate, liquid crystal panel, EL panel, PDP panel, optical fiber, color filter, optical disk substrate, lens and prism, and as an adhesive for a liquid crystal panel, EL panel, PDP panel, color filter and optical disk substrate, which comprise an inorganic substrate.

(Adhesiveness to Organic Substrate)

The ultraviolet curable resin compositions prepared in Examples 24, 31 and 32 were respectively coated on various inorganic substrates so as to form a film of about 15 μm thick after curing. Using the above mentioned ultraviolet irradiation apparatus, ultraviolet rays were irradiated such that the cumulative intensity became 500 mJ/cm$^2$ at 365 nm by means of a UV detector. The resultant cured products were heat treated at 100° C. for 1 hour. The resultant cured products were evaluated according to a cross-cut cellophane tape peeling test in the General Test Procedures of JIS K-5400.

TABLE 15

|      | Ex. 24 | Ex. 31  | Ex. 32  |
|------|--------|---------|---------|
| PC   | 95/100 | 100/100 | 100/100 |
| PMMA | 0/100  | 100/100 | 100/100 |
| PET  | 20/100 | 100/100 | 100/100 |
| TAC  | 0/100  | 100/100 | 100/100 |

As is clear from Table 11 and Table 15, it is found that the cured product of Examples 31 and 32 with the component (B) mixed in has somewhat lower surface hardness than that of Example 24, but has considerably improved adhesiveness to an organic substrate. Thus, it is recognized that the ultraviolet curable resin compositions of Examples 31 and 32 are suitable as a coating agent for such articles as an optical waveguide, polarizing plate, liquid crystal panel, EL panel, PDP panel, OHP film, optical fiber, color filter, optical disk substrate, lens, plastic substrate for a liquid crystal cell and prism, and as an adhesive for a liquid crystal panel, EL panel, PDP panel, color filter and optical disk substrate, all of which comprise an organic substrate.

(Refractive Index)

The ultraviolet curable resin compositions prepared in Examples 23, 24, 30 and 33 and Comparative Example 6 were respectively diluted with propylene glycol monomethyl ether acetate in such a way that the nonvolatile components account for 30% by weight. The compositions were coated on a silicon substrate respectively so as to form a film with a thickness of about 50 nm after curing. The solvent was dried at 120° C. for 15 minutes. After drying, ultraviolet rays were irradiated using the above mentioned ultraviolet irradiation apparatus, such that the cumulative intensity became 200 mJ/cm$^2$ at 365 nm by means of a UV detector. Separately, the ultraviolet curable resin composition prepared in Comparative Example 3 was diluted with propylene glycol monomethyl ether acetate in such a way that the nonvolatile components account for 30% by weight. The composition was coated on a silicon substrate so as to form a film with a thickness of about 50 nm after curing. The solvent was dried at 60° C. for 10 minutes, followed by thermocuring at 120° C. for 30 minutes. The refractive index of the resultant cured products as measured using an ellipsometer ("ESM-1" (trade name) manufactured by Ulvac Inc.).

TABLE 16

|                  | Ex. 23 | Ex. 24 | Ex. 30 | Ex. 33 | Com. Ex. 6 | Com. Ex. 3 |
|------------------|--------|--------|--------|--------|------------|------------|
| Refractive Index | 1.60   | 1.56   | 1.60   | 1.54   | 1.56       | 1.53       |

As is clear from Table 16, it is found that the cured product of Example 23 in which titanate was mixed as the component (a2), and the cured product of Example 30 in which titanate was mixed as the component (F) have an improved refractive index, as compared to the cured product of Example 24. Thus, it is recognized that the ultraviolet curable compositions prepared in Examples 23 and 30 are suitable as a coating agent forming an antireflection film, for such articles as an optical waveguide, polarizing plate, liquid crystal panel, EL panel, PDP panel, OHP film, optical fiber, color filter, optical disk substrate, lens, plastic substrate for liquid crystal cell and prism.

(Preparation of Transparent Substrate)

The compositions prepared in Examples 33 and Comparative Example 6 were cured, and impregnated in a commercially available glass cloth (Clipper Glass Cloth Micro B, film thickness of 28 μm, refractive index of 1.54) in such a way that (weight of glass cloth)/(weight of composition) satisfies 100/200. Using the above mentioned ultraviolet irradiation apparatus, ultraviolet rays were irradiated such that the cumulative intensity became 2,000 mJ/cm$^2$ at 365 nm by means of a UV detector. A substrate of 80 μm thick was obtained. Separately, the composition prepared in Comparative Example 3 was impregnated in a glass cloth. After volatilizing the solvent in a drier at 60° C., the remaining product was heated at 120° C. for 3 hours, and subjected to press molding at 150° C. for 1 hour. A substrate of 80 μm thick was obtained. The outer appearance of the resultant substrates was evaluated by visual observation. The criteria are as follows.

OK: virtually transparent
Δ: translucent
NG: opaque

The flexibility of the substrate was evaluated by a curvature radius at which a crack is generated upon bending the substrate.

TABLE 17

|                                                                   | Ex. 33 | Com. Ex. 6 | Com. Ex. 3 |
|-------------------------------------------------------------------|--------|------------|------------|
| transparency                                                      | OK     | Δ          | OK         |
| flexibility                                                       | <1 cm  | <1 cm      | 5 cm       |
| difference in refractive index between cured matter and glass cloth | 0      | 0.02       | 0.01       |

As is clear from Table 17, the resultant substrate prepared in Comparative Example 6 was translucent, while those prepared in Example 33 and Comparative Example 3 were virtually transparent. The substrate of Comparative Example 3 generated a crack when the curvature radius became less than 5 cm, while those of Example 33 and Comparative Example 6 did not generate a crack even when they were bent so as for the curvature radius to be less than 1 cm. According to the above various test results, it is recognized that the substrate of Example 33 excels in physical properties of every kind as compared to the substrate of Comparative Example 3 and 6 is suitable as a substrate for such articles as a flexible liquid crystal panel, EL panel, PDP panel and color filter.

(Adhesiveness)

The ultraviolet curable resin compositions prepared in Example 24 and Comparative Example 5 and 6 were respectively coated on a steel plate so as to form a film of about 5 μm thick after curing. The coat was lidded with a polycarbonate plate of 2 mm thick or glass plate of 2 mm thick, on which ultraviolet rays were irradiated, using the above mentioned ultraviolet irradiation apparatus, in such a way that the cumulative intensity became 1,000 mJ/cm$^2$ without the lid at 365 nm by means of a UV detector. The hardness of the resultant cured products was evaluated according to a pencil hardness test in the General Test Procedures of JIS K-5401.

TABLE 18

|          |                   | Ex. 24 | Com. Ex. 5  | Com. Ex. 6 |
|----------|-------------------|--------|-------------|------------|
| hardness | no lid            | 7H     | half-cured  | 5H         |
|          | glass transmission| 6H     | not cured   | 4H         |
|          | PC transmission   | 6H     | not cured   | 4H         |

As is clear from Table 18, the ultraviolet curable resin composition of Comparative Example 5 was not cured at all, while the ultraviolet curable resin compositions of Comparative Example 6 and Example 24 were cured without a problem. According to the above various test results, it is recognized that the substrate of Example 24 excels in physical properties of every kind as compared to the substrate of Comparative Example 6, and is suitable as an adhesive for a liquid crystal panel, EL panel, PDP panel, color filter and optical disk substrate.

(Heat Resistance)

Figure 3:
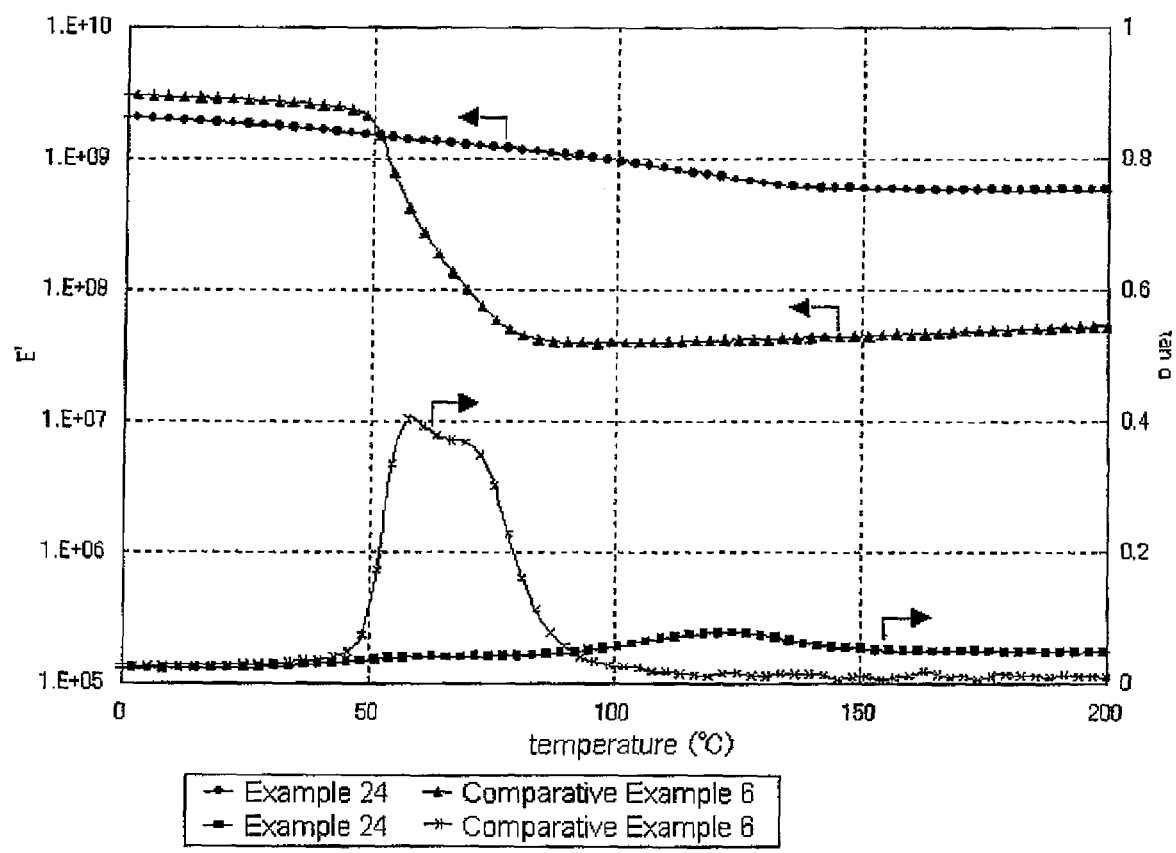
FIG. 3 shows correlation of temperature and dynamic storage elastic modulus of cured products obtained from compositions of Example 24 and Comparative Example 6.

The ultraviolet curable resin compositions prepared in Example 24 and Comparative Example 6 were respectively poured in an aluminum cup so as to form a film of about 1 mm thick after curing. Using the above mentioned ultraviolet irradiation apparatus, ultraviolet rays were irradiated such that the cumulative intensity became 5,000 mJ/cm$^2$ at 365 nm by means of a UV detector. The resultant cured products were heated in a dryer at 200° C. for 30 minutes. The cured product was cut into 5 mm×25 mm, and the dynamic storage elastic modulus was measured by a viscoelasticity measurement instrument ("DMS6100" (trade name) manufactured by Seiko Instruments Inc., measurement conditions: frequency of 1 Hz, slope of 3° C./min) to evaluate the heat resistance. The measurement results are shown in FIG. 3. As is clear from FIG. 3, it is recognized that Example 24 has improved Tg, has less decline in the elastic modulus even at a high temperature and excels in heat resistance, as compared to Comparative Example 6.

INDUSTRIAL APPLICABILITY

The present invention provides curable resin compositions that are capable of providing cured products having various improved properties such as heat resistance, chemical resistance, high surface hardness and a high refractive index. The cured products of the present invention that are prepared from the thermosetting resin compositions are useful as a coating agent (for such applications as an optical waveguide, polarizing plate, liquid crystal panel, EL panel, PDP panel, OHP film, optical fiber, color filter, optical disk substrate, lens, plastic substrate for a liquid crystal cell, and prism), as an adhesive (for such applications as a liquid crystal panel, EL panel, PDP panel, color filter and optical disk substrate) and as a sealing material (for such applications as a light emitting element, light receiving element, photoelectric conversion element and optical transmission-related component). According to the present invention, ultraviolet curability by an ene-thiol reaction is utilized.

The invention claimed is:

1. A curable resin composition comprising:
a condensate (A) having two or more thiol groups in one molecule on average and obtained by hydrolysis and condensation of a thiol-containing alkoxysilane (a1) of the general formula (1):

$$R^1Si(OR^2)_3 \qquad (1)$$

wherein R$^1$ represents a hydrocarbon group of carbon number 1 to 8 having at least one thiol group, or an aromatic hydrocarbon group having at least one thiol group; and R$^2$ represents a hydrocarbon group of carbon number 1 to 8; and at least one compound selected from the group consisting of a compound (C) having at least two isocyanate groups and a compound (D) having a carbon-carbon double bond having at least two allyl groups, wherein the [total mole number of any unreacted alkoxy group]/[total mole number of the alkoxy group included in the thiol-containing alkoxysilane (a1)] is at most 0.3.

2. The curable resin composition of claim 1, wherein the condensate (A) is prepared by hydrolysis of alkoxysilane (a1) in the presence of formic acid, followed by condensation reaction of the hydrolysate in the presence of a solvent.

3. The curable resin composition of claim 1, wherein the condensate (A) further comprises a metal alkoxide (a2) having no thiol group as the constituent, and
wherein the [total mole number of any unreacted alkoxy group]/[total mole number of the alkoxy group included in the thiol-containing alkoxysilane (a1) and the metal alkoxide (a2)] is at most 0.3.

4. The curable resin composition of claim 3, wherein the amount of water necessary for the hydrolysis reaction satisfies the relationship that the [mole number of water used for hydrolysis reaction]/[total mole number of alkoxy group included in the thiol-containing alkoxysilane (a1) and the metal alkoxide (a2)] is 0.4 to 10.

5. The curable resin composition of claim 1, wherein the alkoxysilane (a1) is 3-mercaptopropyltrimethoxysilane; and
the curable resin composition further comprising:
alkoxysilane (a1) and/or the hydrolysate (excluding a condensate thereof) (E); and
metal alkoxide (a2) and/or the hydrolysate (excluding a condensate thereof) (F).

6. The curable resin composition of claim 1, wherein the alkoxysilane (a1) is 3-mercaptopropyltrimethoxysilane.

7. The curable resin compound of claim 1, wherein the compound (C) is isophorone diisocyanate.

8. The curable resin composition of claim 1, wherein the at least one compound is the compound (D).

9. The curable composition of claim 1, further comprising alkoxysilane (a1) and/or the hydrolysate (excluding a condensate thereof) (E).

10. The curable resin composition of claim 9, wherein the component (E) is 3-mercaptopropyltrimethoxysilane and/or the hydrolysate (excluding a condensate thereof).

11. The curable resin composition of claim 1, further comprising a metal alkoxide (a2) and/or the hydrolysate (excluding a condensate thereof) (F).

12. The curable resin composition of claim 11, wherein the component (F) is at least one selected from the group consisting of alkoxysilanes, alkoxytitaniums and alkoxyzirconiums.

13. The curable resin composition of claim 1, wherein the content of the nonvolatile components accounts for at least 90% by weight.

14. The curable resin composition of claim 1, further comprising a compound capable of suppressing the ene-thiol reaction.

15. A coated article which has a coating layer on a substrate, wherein the coating layer is prepared by curing the curable resin composition of claim 1.

16. The coated article of claim 15, wherein the refractive index of the coating layer is higher than that of the substrate.

17. A transparent substrate, which is prepared by impregnating the curable resin composition of claim 1 in glass cloth, and curing the curable resin composition.

18. The transparent substrate of claim 17 for an optical waveguide, polarizing plate, liquid crystal panel, EL panel, PDP panel, color filter, optical disk substrate and plastic substrate for liquid crystal cell.

19. The curable resin composition of claim 1, wherein the condensate (A) further comprises a metal alkoxide (a2) having no thiol group and the amount of water necessary for the hydrolysis reaction satisfies the relationship that the [mole number of water used for hydrolysis reaction]/[total mole number of alkoxy group included in the thiol-containing alkoxysilane (a1) and the metal alkoxide (a2)] is 0.4 to 10.

20. A curable resin composition which is prepared by hydrolysis of a thiol-containing alkoxysilane (a1) of the general formula (1):

$$R^1Si(OR^2)_3 \qquad (1)$$

wherein $R^1$ represents a hydrocarbon group of carbon number 1 to 8 having at least one thiol group, or an aromatic hydrocarbon group having at least one thiol group; and $R^2$ represents a hydrocarbon group of carbon number 1 to 8, in the presence of formic acid, followed by condensation reaction of the hydrolysate in the presence of a solvent and a compound (D) having a carbon-carbon double bond having at least two allyl groups, wherein the [total mole number of any unreacted alkoxy group]/[total mole number of the alkoxy group included in the thiol-containing alkoxysilane (a1)] is at most 0.3.

21. A curable resin composition comprising:

a condensate (A) having two or more thiol groups in one molecule on average and obtained by hydrolysis and condensation of a thiol-containing alkoxysilane (a1) of the general formula (1):

$$R^1Si(OR^2)_3 \qquad (1)$$

wherein $R^1$ represents a hydrocarbon group of carbon number 1 to 8 having at least one thiol group, or an aromatic hydrocarbon group having at least one thiol group; and $R^2$ represents a hydrocarbon group of carbon number 1 to 8; and at least one compound selected from the group consisting of a compound (C) having at least two isocyanate groups and a compound (D) having a carbon-carbon double bond having at least two allyl groups, wherein the condensate (A) further comprises a metal alkoxide (a2) having no thiol group, wherein the amount of water necessary for the hydrolysis reaction satisfies the relationship that the [mole number of water used for hydrolysis reaction]/[total mole number of alkoxy group included in the thiol-containing alkoxysilane (a1) and the metal alkoxide (a2)] is 0.4 to 10.

22. A curable resin composition comprising:

a condensate (A) which is prepared by hydrolysis of a thiol-containing alkoxysilane (a1) of the general formula (1):

$$R^1Si(OR^2)_3 \qquad (1)$$

wherein $R^1$ represents a hydrocarbon group of carbon number 1 to 8 having at least one thiol group, or an aromatic hydrocarbon group having at least one thiol group; and $R^2$ represents a hydrocarbon group of carbon number 1 to 8, in the presence of formic acid, followed by condensation reaction of the hydrolysate in the presence of a solvent and a compound (D) having a carbon-carbon double bond having at least two allyl groups, wherein the amount of water necessary for the hydrolysis reaction satisfies the relationship that the [mole number of water used for hydrolysis reaction]/[total mole number of alkoxy group included in the thiol-containing alkoxysilane (a1) and the metal alkoxide (a2)] is 0.4 to 10.

* * * * *